(12) United States Patent
Palmigiani et al.

(10) Patent No.: US 12,710,512 B2
(45) Date of Patent: Aug. 18, 2026

(54) DEVICE FOR ACQUIRING A DEPTH MAP OF A SCENE

(71) Applicant: Commissariat à l'Énergie Atomique et aux Énergies Alternatives, Paris (FR)

(72) Inventors: Gaelle Palmigiani, Grenoble Cedex (FR); Yvon Cazaux, Grenoble Cedex (FR); Alexis Rochas, Grenoble Cedex (FR); François Ayel, Grenoble Cedex (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 437 days.

(21) Appl. No.: 18/571,201

(22) PCT Filed: Jun. 16, 2022

(86) PCT No.: PCT/EP2022/066444
§ 371 (c)(1),
(2) Date: Dec. 15, 2023

(87) PCT Pub. No.: WO2022/268625
PCT Pub. Date: Dec. 29, 2022

(65) Prior Publication Data

US 2024/0280672 A1 Aug. 22, 2024

(30) Foreign Application Priority Data

Jun. 21, 2021 (FR) ....................................... 2106575

(51) Int. Cl.
*G01S 7/481* (2006.01)
*G01S 7/4914* (2020.01)
(Continued)

(52) U.S. Cl.
CPC .......... *G01S 7/4816* (2013.01); *G01S 7/4914* (2013.01); *G01S 7/4915* (2013.01); *G01S 17/32* (2013.01); *G01S 17/894* (2020.01)

(58) Field of Classification Search
CPC .... G01S 7/4816; G01S 7/4914; G01S 7/4915; G01S 17/32; G01S 17/894
See application file for complete search history.

(56) References Cited

U.S. PATENT DOCUMENTS

2007/0097349 A1* 5/2007 Wada .................... G01S 7/4915 356/4.06
2012/0268727 A1* 10/2012 Schrey .................... G01C 3/08 250/214 R (Continued)

FOREIGN PATENT DOCUMENTS

FR 3 098 991 A1 1/2021
WO WO-2021050003 A1 * 3/2021 ........... G01S 17/894

(Continued)

OTHER PUBLICATIONS

International Search Report and Written Opinion for International Application No. PCT/EP2022/066444, mailed Oct. 14, 2022.

*Primary Examiner* — Fernando Alcon
(74) *Attorney, Agent, or Firm* — Wolf, Greenfield & Sacks, P.C.

(57) ABSTRACT

A device including a sensor of a light signal. The sensor includes a first level stacked on a second level. Each level including comprises an array of pixels, each including at least one photodetector, each photodetector of the first level being stacked on a photodetector of the second level. Each level is associated with a frequency, the frequency of the second level being equal to k times the frequency of the first level. A circuit is configured to calculate a distance for each pixel and a depth map of a scene.

23 Claims, 12 Drawing Sheets

(51) Int. Cl.

| | |
|---|---|
| ***G01S 7/4915*** | (2020.01) |
| ***G01S 17/32*** | (2020.01) |
| ***G01S 17/894*** | (2020.01) |

(56) References Cited

U.S. PATENT DOCUMENTS

| | | | | |
|---|---|---|---|---|
| 2016/0181226 | A1 | 6/2016 | Wan | |
| 2016/0181295 | A1* | 6/2016 | Wan .................... | H10F 39/8053 257/440 |
| 2017/0194368 | A1* | 7/2017 | Roy .................... | H10F 39/8037 |
| 2018/0084238 | A1 | 3/2018 | Chossat et al. | |
| 2019/0191067 | A1 | 6/2019 | Valliant et al. | |
| 2023/0412934 | A1* | 12/2023 | Ookubo ................. | H04N 25/60 |
| 2024/0255622 | A1* | 8/2024 | Nakada ................... | G01S 7/487 |
| 2025/0324179 | A1* | 10/2025 | Han ..................... | H04N 25/772 |

FOREIGN PATENT DOCUMENTS

| | | | | |
|---|---|---|---|---|
| WO | WO-2022035573 A1 * | 2/2022 | ........... | G01S 7/4804 |
| WO | WO-2026053862 A1 * | 3/2026 | ........... | G01S 7/4865 |

* cited by examiner

DEVICE FOR ACQUIRING A DEPTH MAP OF A SCENE

This application is a national stage filing under 35 U.S.C. § 371 of International Patent Application Serial No. PCT/EP2022/066444, filed Jun. 16, 2022, which claims priority to French patent application 21/06575 filed on Jun. 21, 2021 and entitled "Device for acquiring a depth map of a scene". The contents of these applications are incorporated herein by reference in their entirety.

TECHNICAL FIELD

The present application concerns the field of devices for acquiring a depth map, or image, of a scene.

PRIOR ART

Image acquisition devices capable of acquiring depth information have been provided. For example, indirect time-of-flight (iTOF) sensors act to emit a light signal towards a scene, and then to detect the light signal reflected by elements of the scene. By evaluating the phase shift between the emitted light signal and the reflected signal, it is possible to estimate distances between the sensor and elements, such as objects, of the scene, or relative distances (depths) between elements of the scene.

SUMMARY OF THE INVENTION

There is a need for a depth image acquisition device which overcomes all or part of the disadvantages of known depth image acquisition devices.

For example, it would be desirable to have a depth image acquisition device having a same resolution and same lateral dimensions as a conventional depth image acquisition device, but with an increased accuracy as compared with this conventional device.

An embodiment overcomes all or part of the disadvantages of known depth image acquisition devices.

An embodiment provides a device for acquiring a depth image of a scene, comprising a sensor of a reflected light signal corresponding to the reflection on the scene of an incident light signal. The sensor comprises a first detection level stacked on a second detection level. Each detection level comprises an array of depth pixels, each depth pixel of said level comprising at least one photodetector and being configured to acquire at least first, second, and third samples of charges photogenerated in said pixel during respective first, second, and third durations, the first, second, and third durations of said level being periodic according to a first frequency of said level. Each photodetector of the first level is stacked on a photodetector of the second level. The first frequency of the second level is equal to k times the first frequency of the first level, with k a number greater than or equal to 1. The device further comprises a calculation circuit configured to calculate, for each depth pixel of each of the first and second levels, a distance based on the first, second, and third samples of said depth pixel, and, based on said calculated distances, a depth map of the scene, the depth map of the scene preferably having an increased accuracy as compared with a depth map of the scene reconstructed based on the distances calculated for the depth pixels of the first level and with a depth map of the scene reconstructed based on the distances calculated for the depth pixels of the second level.

According to an embodiment, the device further comprises a circuit for controlling the depth pixels.

According to an embodiment, number k is greater than 1.

According to an embodiment, number k is an integer.

According to an embodiment, number k is greater than 7.

According to an embodiment, the device comprises a light source configured to deliver the incident light signal so that:

- the incident light signal comprises a first light signal at a first wavelength and a second light signal at a second wavelength different from the first wavelength,
- the first light signal is amplitude-modulated at the first frequency of the first level, and
- the second light signal is amplitude-modulated at the first frequency of the second level.

According to an embodiment, the device comprises a filter arranged between the first and second levels of the sensor, configured to block the first light signal and to let through the second light signal.

According to an embodiment, the device further comprises a light source configured to deliver the incident light signal amplitude-modulated simultaneously at the first frequency of the first level and at the first frequency of the second level.

According to an embodiment, number k is determined so that the contribution of the first frequency of the first level to a measurement, by the second level, of the first frequency of the second level in the reflected signal is lower than a target value.

According to an embodiment, the first frequency of the first level induces an error on the calculation of distances for the depth pixels of the second level and number k is determined by a maximum target value of this error.

According to an embodiment, number k is greater than or equal to 20.

According to an embodiment, each depth pixel of the first level is associated with a corresponding depth pixel of the second level.

According to an embodiment, each depth pixel of the first level is stacked on the depth pixel of the second level with which it is associated.

According to an embodiment, for each stack of a depth pixel of the first level on a depth pixel of the second level, the calculation circuit is configured to remove an uncertainty regarding the distance calculated for the depth pixel of the second level based on the distance calculated for the depth pixel of the first level.

According to an embodiment, for each stack of a depth pixel of the first level on a depth pixel of the second level, the calculation circuit is configured:

- to calculate, for each pixel, the distance based on a phase shift modulo 2Π determined based on the first, second, and third samples of said pixel, an uncertainty regarding said calculated distance resulting from the modulo 2Π of said phase shift; and
- to remove said uncertainty regarding the distance calculated for the depth pixel of the second level based on the distance calculated for the depth pixel of the first level.

According to an embodiment, k is equal to 1, each depth pixel comprises at least two photodetectors, each depth pixel of the first level is associated with a corresponding depth pixel of the second level, and the centers of the depth pixels of the first level are offset with respect to the centers of the corresponding depth pixels of the second level.

According to an embodiment, the offset is constant for each capture; or for each two successive captures, the offset is implemented for a single one of the two captures; or for each two successive captures, the offset is different between the two captures.

According to an embodiment, the depth pixel control circuit is configured to implement the offset.

According to an embodiment:

k is equal to 1, each depth pixel comprises at least two photodetectors, each depth pixel of the first level is associated with a corresponding depth pixel of the second level, the centers of the depth pixels of the first level are offset with respect to the centers of the corresponding depth pixels of the second level, and the depth pixel control circuit is configured, for each two successive captures, to:

implement said offset for a single one of the two captures; or implement a different offset between the two captures.

According to an embodiment, the calculation circuit is configured to improve the accuracy of the depth map in a direction of the offset of the centers of the depth pixels of the first level with respect to the centers of the corresponding depth pixels of the second level.

According to an embodiment, the photodetectors of the depth pixels are organized in rows and in columns, the rows are orthogonal to the columns, the rows and columns are orthogonal to a direction of stacking of the first level on the second level, and the offset corresponds to an offset by one row and/or by one column.

According to an embodiment, the device further comprises a circuit configured to synchronize the first, second, and third durations of the first level with, respectively, the first, second, and third durations of the second level.

According to an embodiment, the device further comprises a light source configured to deliver the incident light signal amplitude-modulated at the first frequency only.

According to an embodiment, the sensor is configured to receive the reflected light signal on the side of the first level.

According to an embodiment, at least the first level further comprises 2D image pixels.

According to an embodiment, the photodetectors of the depth pixels are organized in rows and in columns, the rows being orthogonal to the columns, the rows and the columns further being orthogonal to a direction of stacking of the first level on the second level, and the 2D image pixels are arranged between two successive rows and/or between two successive columns.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DESCRIPTION OF EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for the understanding of the described embodiments have been illustrated and described in detail. In particular, the forming of the photosensitive elements, for example photodiodes, 2D image pixels, and depth pixels, has not been detailed, the forming of such pixels being within the abilities of those skilled in the art based on the indications of the present description.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "edge", "back", "top", "bottom", "left", "right", etc., or relative positions, such as terms "above", "under", "upper", "lower", etc., or to terms qualifying directions, such as terms "horizontal", "vertical", etc., it is referred, unless specified otherwise, to the orientation of the drawings.

Unless specified otherwise, the expressions "about", "approximately", "substantially", and "in the order of" signify plus or minus 10%, preferably of plus or minus 5%.

Figure 1:
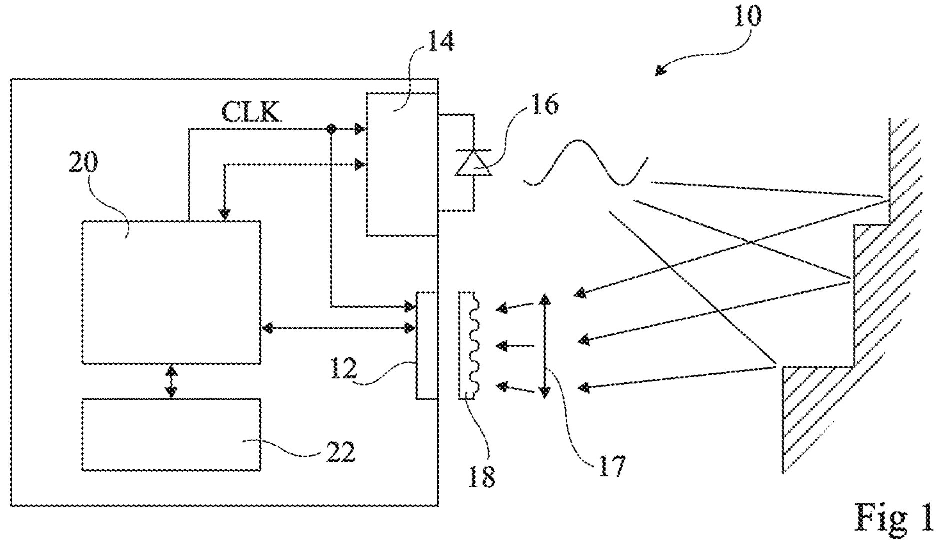
FIG. 1 schematically shows an embodiment of a depth image acquisition device.

FIG. 1 schematically shows an embodiment of a depth image acquisition device 10 comprising a light signal sensor 12. Device 10 comprises, for example, a circuit for emitting a light signal 14 which drives a light source 16, for example a light-emitting diode (LED). Light-emitting diode 16 emits, for example, a light signal at a wavelength in the near-infrared spectrum, for example in the range from 700 nm to 1,100 nm. The light signal emitted by the diode is periodically amplitude-modulated. The light signal generated by light-emitting diode 16 is, for example, emitted towards the scene to be captured via one or a plurality of lenses (not shown in FIG. 1). The light signal reflected by the scene is captured by sensor 12, for example via an imaging lens 17 and an array of microlenses 18, which focus the reflected light signal onto the individual pixels of sensor 12.

Sensor 12 comprises, for example, a plurality of pixels capable of receiving the light signal reflected by the image scene and of detecting the phase of the received signal to form a depth image. These pixels are called depth pixels hereafter.

A calculation circuit 20 of device 10, for example a processor, is coupled to sensor 12 and to transmission circuit 14 and determines, based on the signals captured by the depth pixels of sensor 12, the corresponding distances between these pixels and the scene. The image or depth map generated by processor 20 is, for example, stored in a memory 22 of image acquisition device 10.

Figure 2:
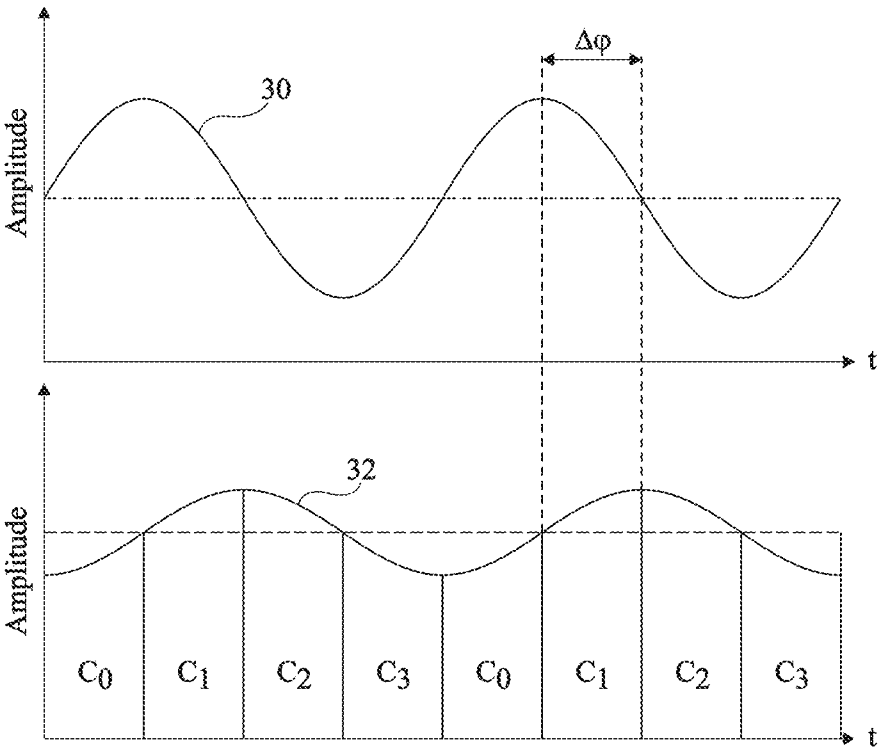
FIG. 2 is a graph illustrating an example of light intensity of an emitted and reflected light signal.

FIG. 2 is a graph showing, with a curve 30, an example of the time variation of the light intensity of the light signal emitted by light-emitting diode 16 towards the scene, and, with a curve 32, an example of the time variation of the light intensity of the light signal received by one of the depth pixels of sensor 12. Although, to simplify the comparison, these signals are shown in FIG. 2 as having substantially the same intensity, in practice the light signal received by each depth pixel is likely to be significantly less intense than the emitted signal.

In the example shown in FIG. 2, the amplitude modulation of the light signal corresponds to a sinusoidal amplitude modulation at a single modulation frequency. However, in alternative embodiments, this periodic amplitude modulation corresponds to a different amplitude modulation, for example to a sum of sinusoidal amplitude modulations, to a triangular amplitude modulation, or to a square-wave amplitude modulation, for example in all or nothing.

Further, although FIG. 2 illustrates the case where the light signal is amplitude-modulated at a single modulation frequency, as will be described in further detail hereafter, in embodiments, the light signal is amplitude-modulated simultaneously at two different modulation frequencies.

The depth pixels of the present disclosure are used to detect the phase of the received light signal. More particularly, there is a phase shift Δφ, modulo 2*Π, between the emitted light signal and the received light signal.

The phase shift Δφ modulo 2*Π is, for example, estimated based on a sampling of the light signal captured by a depth pixel during four distinct sampling windows, each corresponding to a different phase shift relative to the emitted light signal, for example 0°, 90°, 180°, and 270° for four sampling windows. As an example, the four sampling windows are implemented for each period of the light signal. A technique based on the detection of four samples per period is described in further detail in R. Lange and P. Seitz's publication entitled "Solid-state TOF range camera", IEE J. on Quantum Electronics, vol. 37, No. 3, March 2001. Unless otherwise indicated, the embodiments described in the rest of the disclosure are based on the detection of four samples per period.

The samples of each sampling window are, for example, integrated over a large number of modulation periods, for example over approximately 100,000 periods, or, more generally, between 10,000 and 10 million periods. Each sampling window has, for example, a duration of up to one quarter of the period of the light signal. These sampling windows are referred to as C0, C1, C2, and C3 in FIG. 2. In the example of FIG. 2, each sampling window has the same duration and the four sampling windows have a total cycle time equal to the period of the light signal. More generally, there may, or not, be a time interval separating one sampling window from the next one and, in certain cases, there could be an overlapping between sampling windows. Each sampling window for example has a duration in the range from 15% to 35% of the period of the light signal in the case of a pixel capturing four samples per period.

The timing of sampling windows C0 to C3 is controlled in such a way as to be synchronized with the timing of the emitted light signal. For example, light signal emission circuit 14 generates a light signal based on a clock signal CLK (FIG. 1), and sensor 12 receives the same clock signal CLK to control the beginning and end time of each sampling window, for example by using delay elements to introduce the appropriate phase shifts.

In the rest of the disclosure, to make the reading easier, a sampling window and the sample of charges photogenerated during this sampling window are referred to with the same reference.

Based on the integrated samples of the light signal, and for a purely sinusoidal light wave, the phase shift Δφ modulo 2*Π can be determined by using the following equation:

$$\Delta\varphi = \arctan\left(\frac{C_3 - C_1}{C_0 - C_2}\right) \quad \text{[Math 1]}$$

An estimate of the distance d to the object of the image scene can then be calculated by using the equation:

$$d = \frac{c}{4\pi f}\Delta\varphi \quad \text{[Math 2]}$$

where c designates the speed of light, and f the amplitude modulation frequency of the light signal, and the phase shift Δφ obtained with formula Math 1 is estimated modulo 2*Π.

For example, the frequency f of amplitude modulation of the light signal is 25 MHZ, or more generally in the range from 10 MHz and 200 MHz.

In the rest of the disclosure, there is called "photosite" a single photodetector, or photosensitive element, and the assembly of components enabling to acquire at least one sample of charges generated by absorption, by this photodetector, of the light signal reflected by the scene for which a depth image is desired.

Further, there is called "depth pixel" the assembly of components enabling to acquire all the samples required to enable to determine a depth value. In particular, a depth pixel may comprise a plurality of photosites, each corresponding to a distinct photodetector.

In a depth image sensor based on the capture of four samples, to determine the phase shift Δφ modulo 2*Π between the emitted light signal and the light signal received by a depth pixel of the sensor, the received light signal is sampled by transferring, successively and at regular intervals, charges photogenerated in the photosensitive element of a photosite of the pixel during first sampling window C0, charges photogenerated in the photosensitive element of the same photosite or of another photosite of the pixel during second sampling window C1, charges photogenerated in the photosensitive element of the same photosite or of another photosite of the pixel during third sampling window C2, and charges photogenerated in the photosensitive element of the same photosite or of another photosite of the pixel during third sampling window C3.

Each of the above four transfers is, for example, repeated a large number of times, for example 100,000 times, before a corresponding signal is read by an output circuit.

In the rest of the disclosure, the described embodiments and variants correspond to techniques based on the acquisition of four samples of photogenerated charges. However, techniques based on the acquisition of three samples of photogenerated charges are well known by those skilled in the art, who will be capable of adapting the description made for the case with four samples to the case with three samples, for example by removing all that relates to the acquisition of the fourth sample of photogenerated charges, adapting the timing of the three remaining time windows, and adapting formulas [Math 1] and [Math 2]. For example, in this case, the phase shifts between the three sampling windows and the emitted light signal are respectively 0°, 120°, and 240°, each sampling window having a duration in the order of one third of the period of the emitted light signal, for example equal to one third of the period of the emitted light signal.

Figure 3:
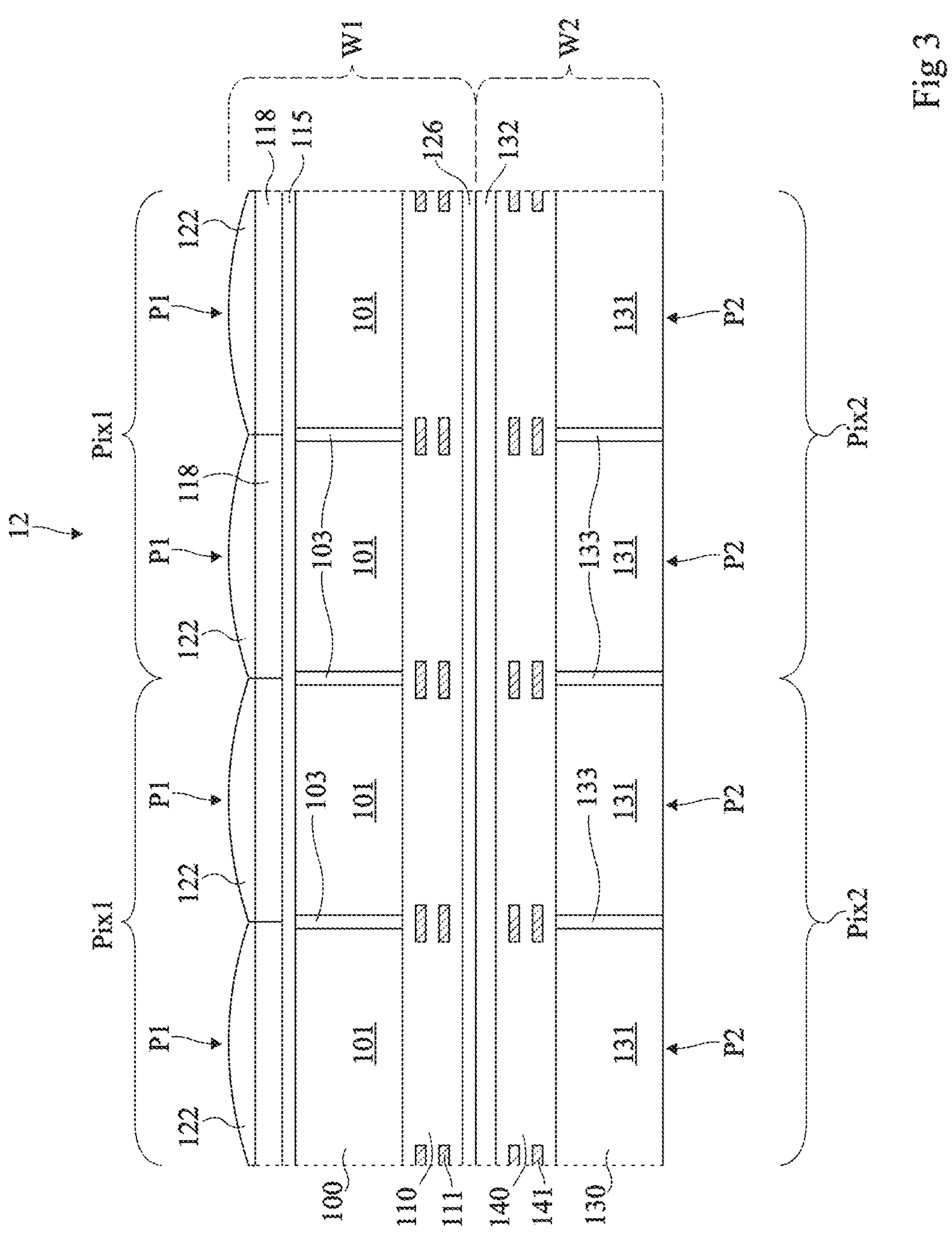
FIG. 3 is a partial and schematic cross-section view illustrating an embodiment of a light signal sensor of a depth image acquisition device.

FIG. 3 is a cross-section view schematically and partially illustrating an embodiment of a sensor 12.

Sensor 12 comprises:

- a first detection level W1, also called first circuit W1, formed inside and on top of a first semiconductor substrate 100, for example a single-crystal silicon substrate; and
- a second detection level W2, also called second circuit W2, formed inside and on top of a second semiconductor substrate 130, for example a single-crystal silicon substrate, first level W1 being stacked, or superimposed, on second level W2.

As an example, the thickness of each of substrates 100 and 130 is for example in the range from 2 μm to 10 μm, for example from 3 μm to 5 μm.

Throughout the rest of the disclosure, sensor 12 is configured so that the reflected light signal that it receives is first received by level W1 before being received by level W2, the light signal received by level W2 having first transited through level W1. In other words, the stack of levels W1 and W2 is configured to receive the reflected light signal on the side of level W1. However, those skilled in the art will be capable of adapting the following description to the case where the sensor is configured to receive the reflected light signal on the side of level W2.

Level W1, respectively W2, comprises an array of depth pixels Pix1, respectively Pix2. Each Pix1 pixel is associated with a corresponding pixel Pix2 and, conversely, each Pix2 pixel is associated with a corresponding pixel Pix1.

In the embodiment illustrated in FIG. 3, each pixel Pix1 is stacked on the corresponding pixel Pix2, or, in other words, the centers of pixels Pix1 are aligned with the corresponding centers of pixels Pix2. In other embodiments, each Pix1 pixel is offset with respect to the corresponding pixel Pix2, or, in other words, the centers of pixels Pix1 are offset with respect to the corresponding centers of pixels Pix2. As an example, the centers of the pixels are called centers of gravity of the pixels.

In the example of FIG. 3, only two pixels Pix1 and two pixels Pix2 are shown, although, in practice, each level W1, W2 comprises, for example, a number of depth pixels much larger than two, for example larger than 100.

Level W1 is configured to estimate the phase shift between a transmitted light signal amplitude-modulated at a frequency Fmod1 and a corresponding reflected light signal, and level W2 is configured to estimate the phase shift between a transmitted light signal amplitude-modulated at a frequency Fmod2, equal to k times frequency Fmod1, with k a number greater than or equal to 1, and a corresponding reflected light signal.

In the rest of the disclosure, the samples C0, C1, C2, and C3 acquired by each pixel Pix1, and the corresponding time windows C0, C1, C2, and C3 will be designated with references C0-1, C1-1, C2-1, C3-1, and, similarly, the samples C0, C1, C2, and C3 acquired by each pixel Pix2, and the corresponding time windows C0, C1, C2, and C3 will be designated with references C0-2, C1-2, C2-2, C3-2. In particular, time windows C0-1, respectively C1-1, C2-1, and C3-1, are periodic at frequency Fmod1, time windows C0-2, respectively C1-2, C2-2, and C3-2 being periodic at frequency Fmod2. Thus, when frequency Fmod1 is different from frequency Fmod2, the duration of sampling windows C0-1, C1-1, C2-1, and C3-1 is different from that of sampling windows C0-2, C1-2, C2-2, and C3-2.

Each pixel Pix1, respectively Pix2, comprises at least one photosite P1, respectively P2. Each photosite P1, respectively P2, comprises a single photodetector 101, respectively 131. Thus, each pixel Pix1, respectively Pix2, comprises at least one photodetector 101, respectively 131. Each photodetector or photosensitive area 101, for example a photodiode, is formed, or arranged, in the substrate 100 of level W1, each photodetector or photosensitive area 131, for example a photodiode, being formed, or arranged, in the substrate 130 of level W2.

In each pixel Pix1, the photosite(s) P1 of pixel Pix1 enable to acquire all the samples C0-1, C1-1, C2-1, C3-1 required to determine a depth value, or distance, for this pixel Pix1. In other words, each pixel Pix1 is configured to acquire the samples of charges C0-1, C1-1, C2-1, and C3-1 photogenerated in pixel Pix1, that is, in the photodetector(s) of pixel Pix1.

Similarly, in each pixel Pix2, the photosite(s) P2 of pixel Pix2 enable to acquire all the samples C0-2, C1-2, C2-2, C3-2 necessary to determine a depth value, or distance, for this pixel Pix2. In other words, each pixel Pix2 is configured to acquire the samples of charges C0-2, C1-2, C2-2, and C3-2 photogenerated in pixel Pix2, that it, in the photodetectors of pixel Pix2.

The number of photosites P1, respectively P2, per pixel Pix1, respectively Pix2, is the same for all pixels Pix1, respectively Pix2. The number of photosites P1 per pixel Pix1 is equal to the number of photosites P2 per pixel Pix2.

When a pixel Pix1 comprises a plurality of photosites P1, and thus a plurality of photodetectors 101, there is called spatial distribution of samples C0-1, C1-1, C2-1, C3-1 in this pixel Pix1 the spatial distribution of the photodetectors 101 of pixel Pix1 with respect to the respective samples C0-1, C1-1, C2-1, C3-1 delivered by these photodetectors 101. Similarly, when a pixel Pix2 comprises a plurality of photosites P2, and thus a plurality of photodetectors 131, there is called spatial distribution of samples C0-2, C1-2, C2-2, C3-2 in this pixel Pix2 the spatial distribution of the photodetectors 131 of pixel Pix2 with respect to the respective samples C0-2, C1-2, C2-2, C3-2 delivered by these photodetectors 131.

Preferably, the spatial distribution of samples C0-1, C1-1, C2-1, C3-1 is identical in each pixel Pix1, and the spatial distribution of samples C0-2, C1-2, C2-2, C3-2 is identical in each pixel Pix2. Further, preferably, the spatial distribution of samples C0-1, C1-1, C2-1, and C3-1 in pixels Pix1 is identical to the spatial distribution of samples C0-2, C1-2, C2-2, and C3-2 respectively in pixels Pix2, or, in other words, the spatial distribution of the samples in pixels Pix1 is identical to that in pixels Pix2.

Each photosite P1 is stacked, or superimposed, on a photosite P2, and, conversely, each photosite P2 is topped with a photosite P1. In the present description, a photosite P1 is said to be stacked on a photosite P2 when the photodetector 101 of photosite P1 is stacked on the photodetector 131 of photosite P2, and, conversely, a photosite P2 is said to be topped with a photosite P2 when the photodetector 131 of photosite P2 is topped with the photodetector 101 of photosite P1. Thus, photosites P1 are organized in an array of photosites P1 comprising rows and columns of photosites P1, photosites P2 being organized in an array of photosites P2 comprising rows and columns of photosites P2. In the present disclosure, photosites P1, respectively P2, are said to be organized in an array of photosites P1, respectively P2, comprising rows and columns of photosites P1, respectively P2, when the photodetectors 101 of photosites P1, respectively 131 of photosites P2, are organized in an array of photodetectors 101, respectively 131, comprising rows and columns of photodetectors 101, respectively 131. Each row of photosites P1 is stacked on a corresponding row of photosites P2, and each column of photosites P1 is stacked on a corresponding column of photosites P2. In the present disclosure, a row, respectively a column, of photosites P1 is said to be stacked on a row, respectively a column, of photosites P2 when the row, respectively column, of corresponding photodetectors 101 is stacked on the row, respectively column, of corresponding photodetectors 131.

In the shown embodiment, level W1 comprises vertical insulating walls 103 crossing substrate 100 throughout its entire thickness and delimiting the substrate portions respectively corresponding to the photodetectors 101 of the photosites P1 of level W1. Vertical insulating walls 103 especially have an optical isolation function, and may further have an electrical insulation function. For example, vertical insulating walls 103 are made of a dielectric material, for example silicon oxide, or of a conductive material, for example polysilicon, covered with a dielectric material, for example silicon oxide, electrically insulating it from substrate 100. As a variant, insulating walls 103 may be omitted.

Similarly, in the shown embodiment, level W2 comprises vertical insulating walls 133 crossing substrate 130 throughout its entire thickness and delimiting the substrate portions respectively corresponding to the photodetectors 131 of the photosites P2 of level W2. Vertical insulating walls 133 particularly have an optical isolation function, and may also have an electrical insulation function. As an example, vertical insulating walls 133 are made of a dielectric material, for example silicon oxide, or of a conductive material, for example polysilicon, covered with a dielectric material, for example silicon oxide, electrically insulating it from substrate 130. As a variant, insulating walls 133 may be omitted.

As an example, the vertical insulating wall 133 surrounding each photosite P2 is for example located substantially vertically in line with the vertical insulating wall 103 surrounding the photosite P1 stacked on this photosite P2.

In the present disclosure, there is respectively meant by front side and back side of a substrate the surface of the substrate coated with an interconnection stack and the surface of the substrate opposite to its front side.

In the embodiment of FIG. 3, the front and back sides of substrate 100 respectively are its lower surface and its upper surface, the front and back sides of substrate 130 respectively being its upper surface and its lower surface. In the example of FIG. 3, the front side of substrate 100, which is coated with an interconnection stack 110, is on the side of, or faces, the front side of substrate 130, which is coated with an interconnection stack 140. Those skilled in the art will however be capable of adapting the present disclosure to the case where the back sides of substrates 100 and 130 would face each other, or to the case where the back side of one of substrates 100 and 130 would face the front side of the other of substrates 100 and 130.

As an example, interconnection stack 110, respectively 140, comprises alternated dielectric and conductive layers. Conductive tracks 111, respectively 141, and electric connection pads (not shown in FIG. 3) are formed in these conductive layers.

Interconnection stack 110 further comprises conductive vias (not illustrated in FIG. 3) coupling tracks 111 to one another and/or to components formed in substrate 100 and/or to the electric connection pads of stack 110. Similarly, interconnection stack 140 comprises conductive vias (not illustrated in FIG. 3) coupling tracks 141 to one another and/or to components formed in substrate 140 and/or to the electric connection pads of stack 140.

Although this is not illustrated in FIG. 3, usually, each pixel Pix1, respectively Pix2, comprises one or a plurality of components, for example MOS (metal oxide semiconductor) transistors, formed on the front side of substrate 100, respectively 130.

As an example, the side of substrate 100 intended to receive a light signal, that is, the back side of substrate 100 in the example of FIG. 3, is coated with a passivation layer 115, for example a silicon oxide layer, an $HfO_2$ layer, an $Al_2O_3$ layer, or a stack of a plurality of layers of different materials which may have other functions than the passivation function only (antireflection, filtering, bonding, etc.), extending over substantially the entire surface of substrate 100. As an example, layer 115 is arranged on top of and in contact with substrate 100.

Preferably, as shown in FIG. 3, each stack of a photosite P1 and of a photosite P2 comprises a filter 118, for example a black resin layer or an interference filter, arranged on the side of sensor 12 intended to receive a light signal, for example on top of and in contact with passivation layer 115, facing the stack of photosensitive elements 101 and 131 of this stack of photosites P1 and P2. Each filter 118 is adapted to transmitting light in the emission wavelength range of light source 16 (FIG. 1). Preferably, filter 118 is adapted to transmitting light only in a relatively narrow waveband centered on the emission wavelength range of the light source 16 of device 10 (FIG. 1). Filter 118 enables to prevent an unwanted generation of charge carriers in the photosensitive elements 101 and 131 of the underlying photosites P1 and P2 under the effect of a light radiation which does not originate from the light source 16 of device 10.

Each stack of a photosite P1 and of a photosite P2 may further comprise a microlens 122 arranged on the side of sensor 12 intended to receive a light radiation, for example on top of and in contact with the filter 118 of this stack of photosites P1 and P2, adapted to focusing the incident light onto the photosensitive element 101 of photosite P1 and/or onto the photosensitive element 131 of the underlying photosite P2.

As an example, the two levels W1 and W2 stacked one on top of the other are assembled to each other by hybrid bonding. For this purpose, level W1 comprises, for example, a layer 126 entirely covering substrate 100 and being interrupted by first electric connection elements (not shown in FIG. 3), for example electric connection pads of stack 110, and level W2 comprises, for example, a layer 132 of same nature as the layer 126 of level W1, layer 132 entirely covering substrate 130 and being interrupted by second electric connection elements (not shown in FIG. 3), for example electric connection pads of stack 140. The hybrid bonding is achieved by placing layer 130 in contact with layer 126, all along substrates 100 and 130, so that the first electric connection elements are in contact with the second electric connection elements. As an example, layers 126 and 132 are made of silicon oxide.

In the example of FIG. 3, where level W1 receives incident light from the back side of substrate 100 and level W2 receives incident light from the front side of substrate 130, the front sides of substrates 100 and 130 face each other, and layers 126 and 132 are respectively arranged on the front side of substrate 100 and on the front side of substrate 130. For example, layer 126 is arranged on top of and in contact with interconnection stack 110 and layer 132 is arranged on top of and in contact with interconnection stack 140.

Although this is not illustrated in FIG. 3, sensor 12 includes a circuit for controlling photosites P1 and P2, that is, a circuit configured to control photosites P1 and P2. This control circuit is more particularly configured to control the sampling, by photosites P1 and P2, of the reflected light signal received by sensor 12. As an example, this control circuit comprises a first circuit configured to control photosites P1, this first circuit being, for example, arranged inside and on top of substrate 100, and a second circuit configured to control photosites P2, this second circuit being, for example, arranged inside and on top of substrate 130. When sensor 12 is implemented in an image acquisition device 10 of the type of that described in relation with FIG. 1, according to an embodiment, the circuit for controlling photosites P1 and P2 is synchronized with circuit 14, for example via signal CLK.

In level W1, each of the time windows C0-1, C1-1, C2-1, and C3-1 is periodic according to frequency Fmod1, corresponding to the amplitude modulation frequency of a light signal detected by level W1, so that a distance, or depth, d can be calculated for each pixel Pix1 based on the charge samples C0-1, C1-1, C2-1, C3-1 provided by this pixel Pix1. In other words, each pixel Pix1 samples the photogenerated charges at a frequency Fe1 equal to N times frequency Fmod1, with N equal to 4 in this embodiment where pixel Pix1 provides four samples C0-1, C1-1, C2-1, C3-1 to calculate a distance or depth d for this pixel Pix1.

Similarly, in level W2, each of time windows C0-2, C1-2, C2-2, and C3-2 is periodic according to frequency Fmod2, equal to k times frequency Fmod1, with k a number greater than or equal to 1. Frequency Fmod2 corresponds to the amplitude modulation frequency of a light signal detected by level W2, so that a distance, or depth, d can be calculated for each pixel Pix2 based on the charge samples C0-2, C1-2, C2-2 and C3-2 provided by this pixel Pix2. In other words, each pixel Pix2 samples the photogenerated charges at a frequency Fe2 equal to N times frequency Fmod2, with N equal to 4 when pixel Pix2 provides four samples C0-2, C1-2, C2-2, and C3-2 to calculate a distance or depth d for this pixel Pix2.

When the sensor 12 described in relation with FIG. 3 is implemented in a device 10 of the type of that described in relation with FIG. 1, according to an embodiment, calculation circuit 20 is then configured to calculate, for each pixel Pix1, respectively Pix2, a distance or depth d, based on the samples C0-1, C1-1, C2-1, C3-1 of pixel Pix1, respectively C0-2, C1-2, C2-2, C3-2. Calculation circuit 20 is further configured to calculate, or generate, a depth map based on the distances d calculated for pixels Pix1, and, further, based on the distances d calculated for pixels Pix2, so that the depth map thus calculated is more accurate than a depth map which would have been generated based on the distances d calculated for pixels Pix1 only, and than a depth map which would have been generated based on the distances d calculated for pixels Pix2 only. In other words, calculation circuit 20 is configured to calculate, based on the distances d calculated for pixels Pix1 and for pixels Pix2, a depth map of the scene having an increased accuracy as compared with a depth map of the scene reconstructed based on the distances d calculated for pixels Pix1 only, and with a depth map of the scene reconstructed based on the distances d calculated for pixels Pix2 only.

More specifically, according to an embodiment, number k is greater than 1. In this case, sensor 12 receives a light signal reflected by a scene, which corresponds to a light signal emitted by source 16 (FIG. 1), amplitude-modulated at frequency Fmod1 and, simultaneously, at frequency Fmod2. Pixels Pix1 then sample this received light signal at frequency Fe1, while pixels Pix2 sample this received light signal at frequency Fe2. Thus, each association of a pixel Pix1 and of a corresponding pixel Pix2 enables to calculate a first distance d for pixel Pix1 and a second distance d for pixel Pix2.

Due to the fact that the first distance, respectively the second distance, is calculated based on a first phase shift, respectively a second phase shift, $\Delta\varphi$ modulo 2*Π, and on formula Math 2, there is an uncertainty resulting from the fact that the phase shift $\Delta\varphi$ is only known modulo 2*Π. Since frequency Fmod1 is lower than frequency Fmod2, the maximum scene depth detectable with no uncertainty linked to the modulo 2*Π is thus greater at frequency Fmod1 than at frequency Fmod2. However, the first distance d calculated at frequency Fmod1 is used, for example by circuit 20, to remove the uncertainty regarding the second distance d calculated at frequency Fmod2. Thus, the maximum scene depth d detectable without the uncertainty linked to the modulo 2*Π is the same at frequency Fmod2 and at frequency Fmod1.

Further, frequency Fmod1 being lower than frequency Fmod2, the measurement error on distance d is smaller at frequency Fmod2.

The use of the two frequencies Fmod1 and Fmod2 enables to benefit from a wider range of distances d measurable with no uncertainty as compared with the case where only frequency Fmod2 would be used, while keeping a smaller measurement error than in the case where only frequency Fmod1 would be used.

In other words, device 10 enables to measure, with no uncertainty linked to the knowing modulo 2*Π of the phase shift, distances d over a range from 0 to at most c/2*Fmod1, with a measurement error corresponding to the measurement error at frequency Fmod2.

As a result, in a z direction of stacking of levels W1 and W2, the depth map calculated by circuit 20 based on the first distances and on the second distances is more accurate (in terms of measurement error due to the use of frequency Fmod2) than a depth map which would be calculated based on the first distances only, and more accurate (in terms of maximum distance measurable with no uncertainty due to the use of frequency Fmod2) than a depth map which would be calculated based on the second distances only.

Circuit 20 is configured to calculate, based on the first and second distances d, that is, on samples C0-1, C0-2, C1-1, C1-2, C2-1, C2-2, C3-1, and C3-2, this more accurate depth map.

Preferably, in embodiments where number k is greater than 1, each pixel Pix1 is stacked on the corresponding pixel Pix2 with which pixel Pix1 is associated. In other words, the center of each Pix1 pixel is aligned, in the z direction, with the center of the corresponding Pix2 pixel associated with this pixel Pix1. Indeed, this enables not to decrease the accuracy of the depth map calculated in two directions x and y, orthogonal to each other and to the z direction.

As an example, when number k is greater than 1, frequency Fmod1 is in the range from 10 MHz to 150 MHz, while frequency Fmod2 may be in the range from 20 MHz to 300 MHz.

According to another embodiment, number k is equal to 1. In this case, sensor 12 receives a light signal reflected by a scene, which corresponds to a light signal emitted by source 16 (FIG. 1) which is amplitude-modulated at frequency Fmod1 only. Pixels Pix1 then sample this received light signal at frequency Fe1 and pixels Pix2 sample this light signal at frequency Fe2 equal to frequency Fe1. In this embodiment, each pixel Pix1, respectively Pix2, comprises a plurality of photosites P1, respectively P2. Further, in this embodiment, the centers of pixels Pix are offset, in the x direction and/or in the y direction, with respect to the centers of pixels Pix2. In other words, each pixel Pix1 has its center offset from the center of the pixel Pix2 with which this Pix1 pixel is associated.

According to an embodiment where k is equal to 1, the offset of the center of each pixel Pix1 with respect to the center of the pixel Pix2 with which it is associated is implemented permanently, that is, it is identical at each capture of the scene by device 10.

According to another embodiment where k is equal to 1, the offset of the center of each pixel Pix1 with respect to the center of the pixel Pix2 with which it is associated is only implemented one capture of the scene out of two.

According to still another embodiment where k is equal to 1, for each two successive captures of the scene, the offset of the center of each pixel Pix1 with respect to the center of the pixel Pix2 with which it is associated is different between the two captures.

As an example, the offset of the center of each pixel Pix1 with respect to the center of the pixel Pix2 with which it is associated is implemented by the circuit for controlling depth pixels Pix1 and Pix2, and thus photosites P1 and P2, for example due to the control signals delivered to pixels Pix1 and/or pixels Pix2. The implementation of such an offset is within the abilities of those skilled in the art, in particular based on the examples of embodiments which are described in relation with FIGS. 12 to 15.

As an example, when number k is equal to 1, frequencies Fmod1 and Fmod2 are in the range from 10 MHz to 300 MHZ.

Due to the fact that circuit 20 is configured to calculate, for each association of a pixel Pix1 and of a corresponding pixel Pix2, a first distance d between this pixel Pix1 and the scene, that is, between the center of pixel Pix1 and the scene, and a second distance d between pixel Pix2 and the scene, that is, between the center of pixel Pix2 and the scene, and, further, that these two Pix1 and Pix2 pixels have their centers offset, the first distance d is offset with respect to the second distance d. This amounts to doubling the number of distances d available for the calculation of a depth map by circuit 20. As a result, the depth map calculated by circuit 20 based on the distances d calculated for pixels Pix1 and on the distances d calculated for pixels Pix2 is more accurate, in a plane defined by the x and y directions, than a depth map which would be calculated based on the distances calculated for pixels Pix1 only and than a depth map which would be calculated based on the distances calculated for pixels Pix2 only. In other words, calculation circuit 20 is configured to improve the accuracy of the depth map in the direction of the offset of the centers of pixels Pix1 with respect to the centers of pixels Pix2.

Figure 4:
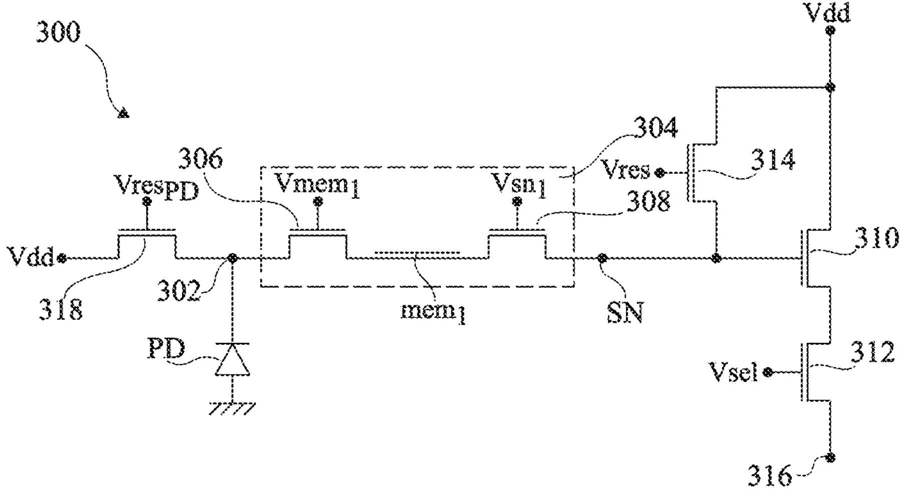
FIG. 4 shows an embodiment of a circuit of a photosite.

FIG. 4 is a circuit diagram illustrating an embodiment of a circuit 300 of a depth photosite. According to an embodiment, all photosites P1 and P2 are implemented by circuits 300, each photosite corresponding to a distinct circuit 300.

Circuit 300 is adapted to acquiring a single charge sample C0-1, C1-1, C2-1, C3-1, C0-2, C1-2, C2-2, or C3-2.

Circuit 300 is capable of performing a charge storage. Circuit 300 comprises a photosensitive element PD coupled between a node 302 and a reference power source, for example the ground, photosensitive element PD for example being a photodiode. More particularly, in the case where the circuit 300 corresponds to a photosite P1, element PD corresponds to the photosensitive area 101 of photosite P1 (FIG. 3), and, in the case where circuit 300 corresponds to a photosite P2, element PD corresponds to the photosensitive area 131 of photosite P2 (FIG. 3).

Node 302 is coupled to a sense node SN via a sampling circuit 304. Sampling circuit 304 comprises a memory $mem_1$ coupled to node 302 by a transfer gate 306 which is, for example, an N-channel MOS transistor. Memory $mem_1$ is also coupled to sense node SN by an additional transfer gate 308, which is also, for example, an N-channel MOS transistor. Transfer gate 306 is controlled by a signal $Vmem_1$ applied to its gate, and transfer gate 308 is controlled by a signal $Vsn_1$ applied to its gate. Memory $mem_1$ provides a charge storage area having charges transferred from photosensitive element PD temporarily stored therein.

Circuit 300 further comprises an output circuit formed of a source follower transistor 310, of a selection transistor 312, and of a reset transistor 314, these transistors being, for example, N-channel MOS transistors. Sense node SN is coupled to the control node of transistor 310, which for example has its drain coupled to power supply voltage source Vdd, and its source coupled to an output line 316 of circuit 300 by transistor 312, which is controlled by a signal Vsel applied to its gate. Sense node SN is also coupled to power supply voltage source Vdd via transistor 314, which is controlled by a signal Vres applied to its gate. In alternative embodiments, the output circuit could be shared by a plurality of photosites, sense node SN being for example coupled to the sampling circuit of one or a plurality of adjacent photosites.

Circuit 300 also comprises, for example, a transistor 318 coupling node 302 to power supply voltage source Vdd and enabling to reset photodiode PD. Transistor 318 is controlled, for example, by a signal $Vres_{PD}$. It thus enables to control the exposure time by ensuring a draining off of photodiode PD before the starting of a synchronous integration for all the photodiodes PD of the sensor, and to provide an anti-blooming function to prevent an overflowing of the photodiode into memories $mem_1$ during the general reading of the array.

Figure 5:
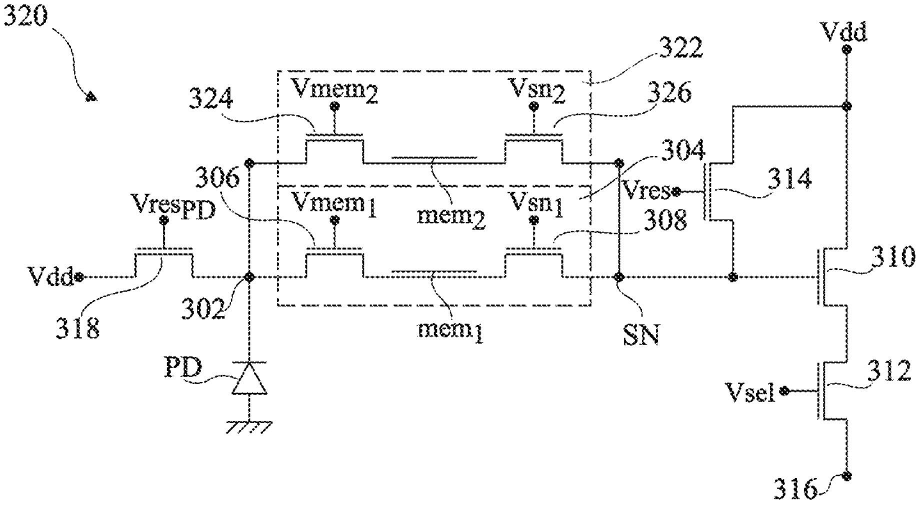
FIG. 5 shows another embodiment of a circuit of a photosite.

FIG. 5 is a circuit diagram illustrating another embodiment of a circuit 320 of a depth photosite. According to an embodiment, all photosites P1 and P2 are implemented by circuits 320, each photosite corresponding to a distinct circuit 320.

As an example, a circuit similar to circuit 320 is described in further detail in French patent application FR 15/63457. For example, a timing diagram illustrating an example of operation of this circuit is shown in FIG. 3 of FR 15/63457, and the same example of operation applies in the context of the present application.

Circuit 320 comprises all the elements of circuit 300 and further comprises another sampling circuit 322 connected between node 302 and node SN and comprising circuit elements similar to sampling circuit 304, and in particular circuit 322 comprises a memory $mem_2$, a transfer gate 324 controlled by a signal $Vmem_2$, and a transfer gate 326 controlled by a signal $Vsn_2$.

Circuit 320 enables to acquire two samples for one depth image. The use of circuit 320 advantageously enables to decrease the number of transistors per photosite. The reading from the two memories $mem_1$ and $mem_2$ is performed sequentially.

Figure 6:
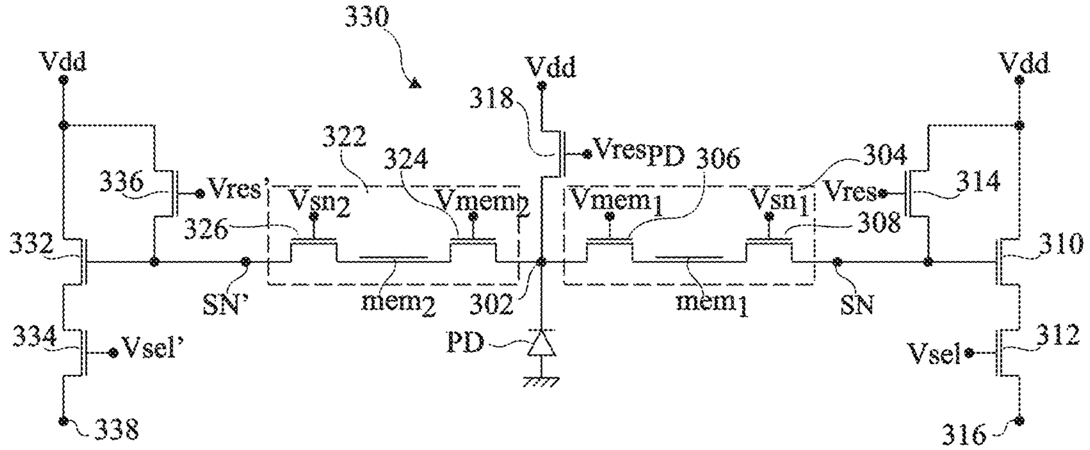
FIG. 6 shows still another embodiment of a circuit of a photosite.

FIG. 6 is a circuit diagram illustrating another embodiment of a circuit 330 of a depth photosite. According to an embodiment, all photosites P1 and P2 are implemented with circuits 330.

Circuit 330 comprises all the elements of circuit 320 shown in FIG. 5, with the difference that sampling circuit 322 is connected between node 302 and a node SN', and that it further comprises an output circuit formed of a source follower transistor 332, of a selection transistor 334, and of a reset transistor 336, these transistors being, for example, N-channel MOS transistors. Sense node SN' is coupled to the control node of transistor 332, which for example has its drain coupled to power supply voltage source Vdd, and its source coupled to an output line 338 of circuit 330 by transistor 334, which is controlled by a signal Vsel' applied to its gate. Sense node SN' is also coupled to power supply voltage source Vdd via transistor 336, which is controlled by a signal Vres' applied to its gate. Circuit 330 enables to acquire two samples for one depth image. The reading from the two memories $mem_1$ and $mem_2$ may be performed simultaneously.

Figure 7:
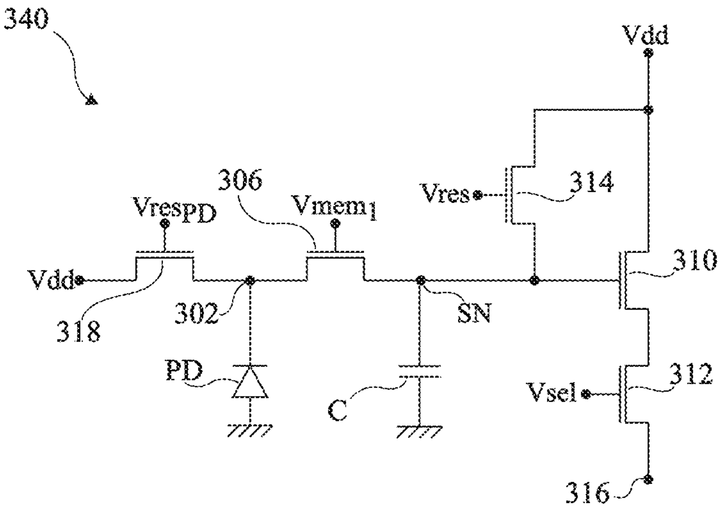
FIG. 7 shows still another embodiment of a circuit of a photosite.

FIG. 7 is a circuit diagram illustrating another embodiment of a circuit 340 of a depth photosite. According to an embodiment, all photosites P1 and P2 are implemented by circuits 340, each photosite corresponding to a distinct circuit 340.

Circuit 340 comprises all the elements of the circuit 300 shown in FIG. 4, with the difference that transistor 308 and memory $mem_1$ are not present, transistor 306 being directly connected to sense node SN.

In the case of circuit 340, the charges are directly stored on sense node SN. There is no intermediate storage. It is spoken in this case of a voltage storage. A capacitor C may be added to sense node SN, connected between sense node SN and the ground, to increase the dynamic range. The storage capacity at sense node SN may also be only due to intrinsic capacitances present on the sense node, for example by the sum of the gate capacitance of the transistor 310 connected to this node, of the source capacitance of the transistor 314 connected to this node, of the drain capacitance of the transistor 306 connected to this node, and of the equivalent capacitance between electric connections connected to node SN and neighboring electric connections.

The cases of voltage storage photosites, with a parallel or sequential readout, can be easily derived from the cases of charge storage photosites previously discussed in relation with FIGS. 5 and 6, by removing transistors 308, 326 and memories $mem_1$, $mem_2$.

More generally, those skilled in the art are capable of deducing from the previously described cases of photosites adapted to acquiring two samples for a depth image, with a charge or voltage storage, and a parallel or sequential readout, cases of photosites adapted to acquiring three or four samples for a depth image, with a charge or voltage storage, and a parallel or sequential readout.

In embodiments where k is equal to 1, preferably, the control signals delivered to photosites P1 for the acquisition of samples C0-1, respectively C1-1, C2-1, and C3-1, are identical to those delivered to photosites P2 for the acquisition of samples C0-2, respectively C1-2, C2-2, and C3-2. Preferably, sampling windows C0-1, C1-1, C2-1, and C3-1 are in phase, or synchronized, with sampling windows C0-2, C1-2, C2-2, and C3-2 respectively. To achieve this, sensor 12 comprises, for example, a circuit configured to synchronize durations C0-1, C1-1, C2-1, and C3-1 with durations C0-2, C1-2, C2-2, and C3-2 respectively, this circuit comprising, for example, delay lines.

In embodiments where k is greater than 1, due to the fact that sampling windows C0-1, C1-1, C2-1, and C3-1 are periodic at frequency Fmod1 and sampling windows C0-2, C1-2, C2-2, and C3-2 are periodic at frequency Fmod2, the control signals delivered to photosites P1 for the acquisition of samples C0-1, respectively C1-1, C2-1, and C3-1, are different from those delivered to photosites P2 for the acquisition of samples C0-2, respectively C1-2, C2-2, and C3-2.

FIGS. 8 to 11 illustrate details of implementation of embodiments where number k is greater than 1.

Figure 8:
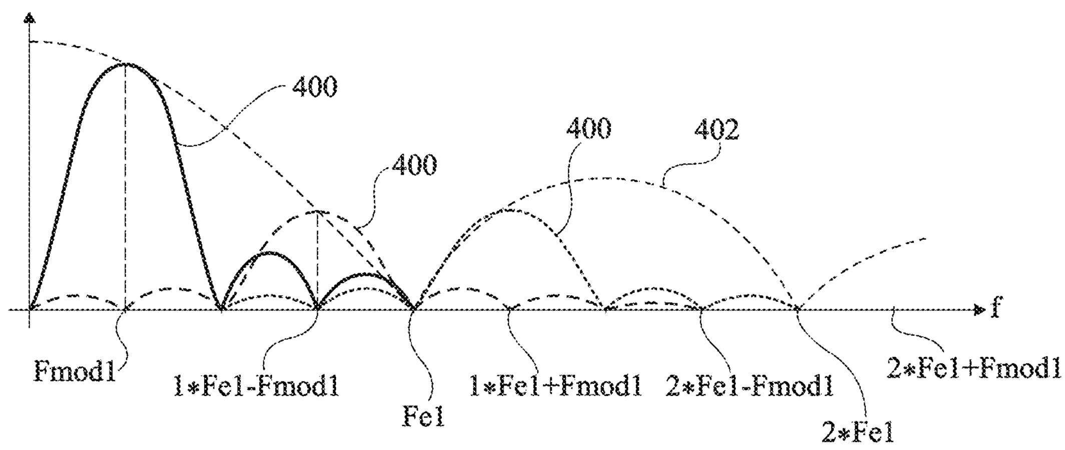
FIG. 8 illustrates, in the frequency domain, details of an embodiment of the sensor of FIG. 3.

FIG. 8 illustrates, with curves in the frequency domain, an implementation mode of the selection of a number k greater than 1.

More specifically, FIG. 8 illustrates, in the frequency domain, the sampling at frequency Fe1 of a signal amplitude-modulated at frequency Fmod1, each sample corresponding to a time window of width 1/(N*Fmod1), with N equal to four in this embodiment based on the sampling of four samples.

Thus, in the frequency domain, cardinal sines 400 associated with frequency Fmod1 can be observed. More specifically, each cardinal sine 400 is centered on one of frequencies r*Fe1−Fmod1 and r*Fe1+Fmod1, with r a positive integer. In FIG. 8, only the cardinal sines centered on Fmod1 (r=0), Fe1−Fmod1 (r=1), and Fe1+Fmod1 (r=1) are shown, and, further, only the main lobe and the first two secondary lobes of each of these cardinal sines 400 are drawn in order not to overload the drawing. The width of the main lobe of each cardinal sine 400 is equal to 2*Fmod1, and that of its secondary lobes to Fmod1. Further, due to the fact that the samples are taken over time windows C0-1, C1-1, C2-1 and C3-1, having a width 1/Fe1, the amplitude of these cardinal sines 400 is multiplied by a cardinal sine 402 centered on the zero frequency, cardinal sine 402 having a main lobe of width 2*Fe1 and secondary lobes of width Fe1.

However, the light signal effectively received by level W1 is not only modulated at frequency Fmod1, but also and simultaneously at frequency Fmod2.

Indeed, according to an embodiment where k is greater than 1, light source 16 (FIG. 1) is configured to deliver a light signal amplitude-modulated at frequency Fmod1 and, simultaneously, at frequency Fmod2. As an example, light source 16 is monochromatic and configured to deliver a light signal at a given wavelength, this signal being amplitude-modulated simultaneously at frequencies Fmod1 and Fmod2. According to another example, light source 16 is polychromatic and configured to deliver a light signal comprising a plurality of wavelengths, preferably two different wavelengths. In this case, light source 16 is configured, for example, so that the emitted signal is amplitude-modulated simultaneously at Fmod1 and Fmod2 for all the wavelengths of the emitted light signal, or, for example, so that the emitted light signal is amplitude-modulated at frequency Fmod1 for a first wavelength or a first wavelength range and, simultaneously, at frequency Fmod2 for a second wavelength different from the first wavelength or a second wavelength range different from the first wavelength range.

Thus, although this is not shown in FIG. 8, in the frequency domain, cardinal sines associated with frequency Fmod2 can also be observed. Each cardinal sine associated with frequency Fmod2 is centered on one of frequencies r*Fe1−Fmod2 and r*Fe1+Fmod2, has a main lobe of width 2*Fmod1 and secondary lobes of width Fmod1. The amplitude of each cardinal sine associated with frequency Fmod2 is, like those of the cardinal sines 400 associated with frequency Fmod1, multiplied by cardinal sine 402.

This results in a contribution of frequency Fmod2 to the measurement, by level W1, of the frequency Fmod1 of the reflected light signal. This contribution of frequency Fmod2 to the measurement made by level W1 results in an error in the phase shift calculated for level W1.

According to an embodiment, so that the contribution of frequency Fmod2 to the measurement, by level W1, of the frequency Fmod1 of the reflected signal does not lead to an error in the phase shift calculated for level W1, number k is chosen to be an integer. Thereby, frequency Fmod1 ends up on a zero of each of the cardinal sines associated with frequency Fmod2.

According to another embodiment, when number k is not an integer, an error is tolerated on the phase shift calculated for level W1, resulting from the contribution of frequency Fmod2 to the measurement, by level W1, of the frequency Fmod1 of the reflected signal. For example, an error below a target error threshold is tolerated, or, in other words, a contribution of frequency Fmod2 to the measurement, by level W1, of the frequency Fmod1 of the reflected signal which is smaller than a target value, is tolerated. Number k is then determined by this target value. In other words, number k is then determined so that the contribution of frequency Fmod2 to the measurement, by level W1, of the frequency Fmod1 of the reflected signal is lower than this target value. As an example, number k is greater than 7, which corresponds to a contribution of frequency Fmod2 to the measurement, by level W1, of frequency Fmod1 which is lower than 2.5%.

The selection of number k so that, in level W1, frequency Fmod2 has little or no effect on the measurement of the phase shift performed at frequency Fmod1 has just been described.

However, in the same way as frequency Fmod2 disturbs the phase shift measurement performed at frequency Fmod1 by level W1, that is, when the received light signal is sampled at frequency Fe1, frequency Fmod1 may disturb the measurement of the phase shift performed at frequency Fmod2 by level W2, that is, when the received light signal is sampled at frequency Fe2. In level W2, the sampling takes place at frequency Fe2=N*Fmod2, whereby, in the frequency domain, each cardinal sine associated with frequency Fmod1 is centered on a corresponding frequency r*Fe2−Fmod1 or r*Fe2+Fmod1 and each cardinal sine associated with frequency Fmod2 is centered on a corresponding frequency r*Fe2−Fmod2 or r*Fe2+Fmod2. Further, the cardinal sines associated with frequencies Fmod1 and Fmod2 each have a main lobe of width 2*Fmod2 and secondary lobes of width Fmod2. However, frequency Fmod1 is lower than frequency Fmod2. It is thus not possible to find an integer value of k for which frequency Fmod2 is located on a zero of the cardinal sines associated with frequency Fmod1.

According to an embodiment where light source 16 is polychromatic and configured so that the light signal is amplitude-modulated at frequency Fmod1 for a first wavelength and, simultaneously, at frequency Fmod2 for a second wavelength different from the first wavelength, a filter is provided between levels W1 and W2, the filter being configured to block the first wavelength and to let through the second wavelength. The filter, for example an interference filter, thus only lets through towards level W2 the portion of the reflected light signal which is modulated at frequency Fmod2. This enables to remove the contribution of frequency Fmod1 to the measurement, by level W2, of the frequency Fmod2 of the reflected signal.

According to another embodiment, an error on the phase shift calculated for level W2, resulting from the contribution of frequency Fmod1 to the measurement, by level W2, of the frequency Fmod2 of the reflected signal, is tolerated. For example, an error smaller than a target error threshold is tolerated, or, in other words, a contribution of frequency Fmod1 to the measurement, by level W2, of the frequency Fmod2 of the reflected signal, which is below a target value, is tolerated. Number k is then further determined by this target value, or, in another words, so that the contribution of frequency Fmod1 to the measurement, by level W2, of the frequency Fmod2 of the reflected signal is lower than this target value. As an example, number k is greater than or equal to 20, which corresponds to a contribution of frequency Fmod1 to the measurement, by level W2, of frequency Fmod2 which is lower than or equal to 5%.

Figure 9:
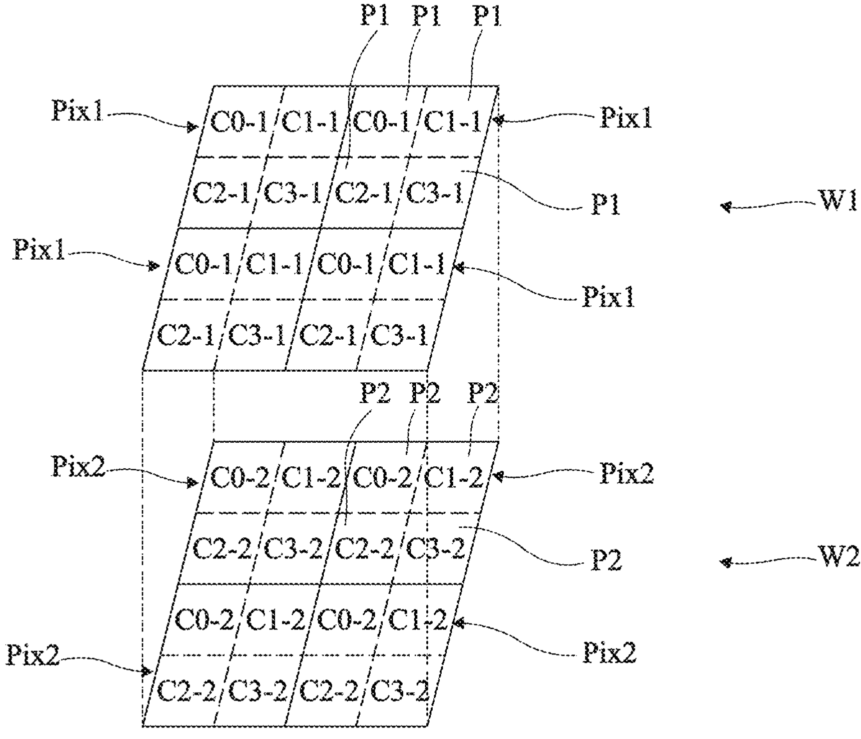
FIG. 9 shows an embodiment of the spatial distribution of the photodetectors of depth pixels of the sensor of FIG. 3.
Figure 10:
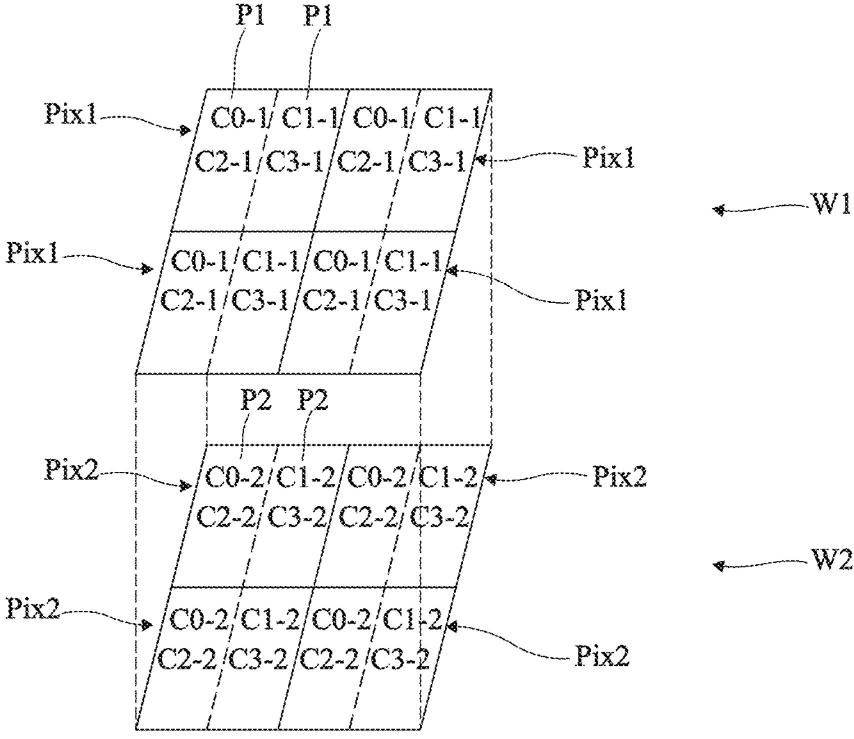
FIG. 10 shows another embodiment of the spatial distribution of the photodetectors of depth pixels of the sensor of FIG. 3.
Figure 11:
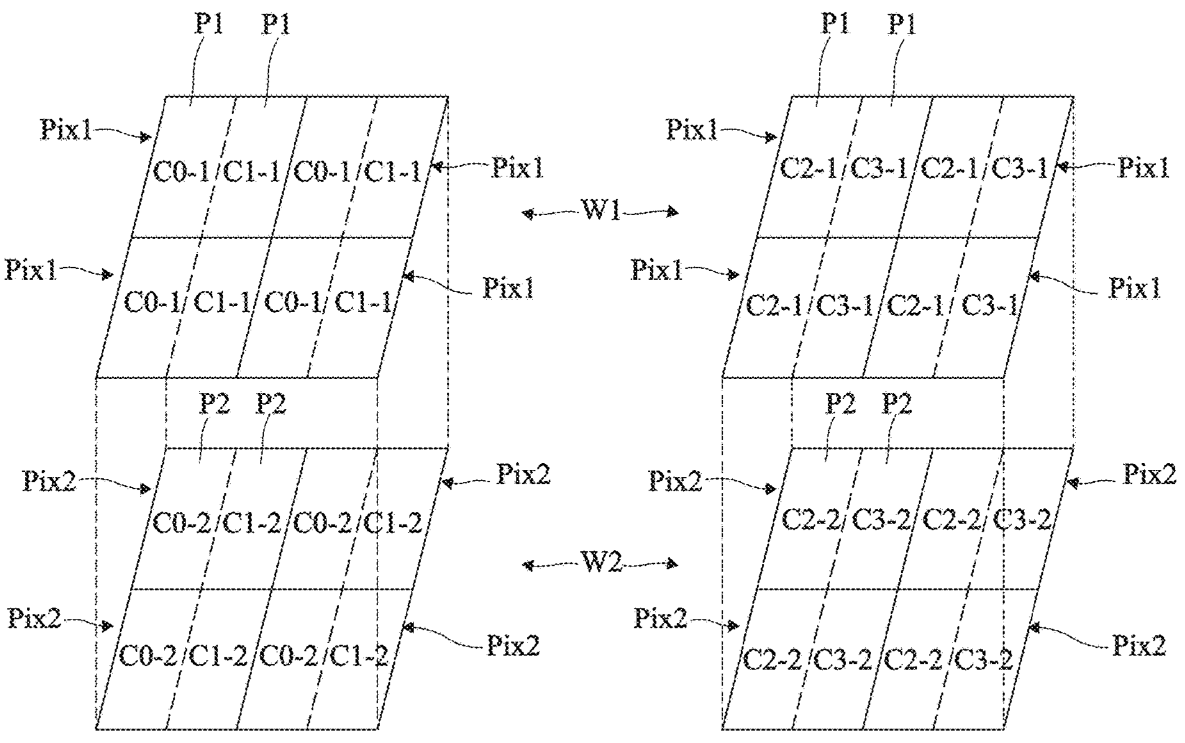
FIG. 11 shows still another embodiment of the spatial distribution of the photodetectors of depth pixels of the sensor of FIG. 3.

FIGS. 9 to 11 each schematically show an example of embodiment of the spatial distribution of samples C0-1, C1-1, C2-1, and C3-1 in pixels Pix1, and of samples C0-2, C1-2, C2-2, and C3-2 in pixels Pix2, for embodiments where number k is greater than 1. In other words, FIGS. 9 to 11 each show an example of embodiment of the spatial distribution of the photosites, and thus of their photodetectors, in pixels Pix1 and Pix2, in relation with the samples that they enable to acquire.

Each of these drawings shows, vertically aligned in the drawing, the spatial distribution of the samples in the pixels Pix1 of level W1 (at the top of the drawing) and the spatial distribution of the samples in the pixels Pix2 of level W2 (at the bottom of the drawing). In these drawings, only part of the array of photosites P1 of level W1 and part of the array of photosites P2 of level W2 are shown.

In these FIGS. 9 to 11, each pixel Pix1 is stacked on a pixel Pix2, or, in other words, the center of each pixel Pix1 is aligned with the center of the corresponding pixel Pix2.

Preferably, as shown in these drawings, the spatial distribution of samples C0-1, C1-1, C2-1, C3-1 in pixels Pix1 is identical to the spatial distribution of samples C0-2, C1-2, C2-2, C3-2, respectively, in pixels Pix2. In other words, the photodetector of a pixel Pix1 having the charges of sample C0-1, respectively C1-1, C2-1, and C3-1, generated therein, is stacked on the photodetector of the corresponding pixel Pix2 having the charges of sample C0-2, respectively C1-2, C2-2, and C3-2, generated therein. Still in other words, in these drawings, each photosite P1 configured to acquire a sample C0-1, respectively C1-1, C2-1, or C3-1, is stacked on a photosite P2 configured to acquire a sample C0-2, respectively C1-2, C2-2 or C3-2.

In other examples, not illustrated, the spatial distribution of samples C0-1, C1-1, C2-1, and C3-1 in each pixel Pix1 may be different from the spatial distribution of samples C0-2, C1-2, C2-2, and C3-2 of the pixel Pix2 with which pixel Pix1 is associated, and having pixel Pix1 stacked thereon.

In the embodiments illustrated in FIGS. 9 to 11, sensor 12 only comprises photosites P1 and P2 for the determination of a depth image, and, preferably, the rows of photosites P1, P2 of the sensor are adjacent two by two, the columns of photosites P1, P2 of the sensor being adjacent two by two.

In FIGS. 9 to 11, pixels Pix1 and Pix2 are delimited by solid lines, and in each pixel Pix1, Pix2, the photosites of the pixel are delimited by dotted lines.

In FIG. 9, each pixel Pix1 comprises four photosites P1 configured to acquire respective samples C0-1, C1-1, C2-1, and C3-1. Further, each pixel Pix2 comprises four photosites P2 configured to acquire respective samples C0-2, C1-2, C2-2, and C3-2.

The capture of four samples C0-1, C1-1, C2-1, and C3-1 by each pixel Pix1 and of four samples C0-2, C1-2, C2-2, and C3-2 by each pixel Pix2 is implemented in a single capture.

In FIG. 10, each pixel Pix1 comprises two photosites P1, a first one of the two photosites P1 being configured to acquire two samples, for example C0-1 and C2-1, and a second one of the two photosites P1 being configured to acquire two other samples, for example C1-1, C3-1. Similarly, each Pix2 pixel comprises two photosites P2, a first one of the two photosites P2 being configured to acquire two samples, for example C0-2 and C2-2, and a second one of the two photosites P2 being configured to acquire two other samples, for example C1-2, C3-2.

The capture of four samples C0-1, C1-1, C2-1, and C3-1 by each pixel Pix1 and of four samples C0-2, C1-2, C2-2, and C3-2 by each Pix2 pixel is implemented in a single capture.

In FIG. 11, each pixel Pix1 comprises two photosites P1, a first one of the two photosites P1 being configured to acquire two samples during two successive captures A (on the left-hand side in FIG. 11) and B (on the right-hand side in FIG. 11), for example sample C0-1 during capture A and sample C2-1 during capture B, a second one of the two photosites P1 being configured to acquire two other samples during the two successive captures A and B, for example sample C1-1 during capture A and sample C3-1 during capture B. Similarly, each pixel Pix2 comprises two photosites P2, a first one of the two photosites P2 being configured to acquire two samples during the two successive captures A and B, for example sample C0-2 during capture A and sample C2-2 during capture B, a second one of the two photosites P2 being configured to acquire two other samples during the two successive captures A and B, for example sample C1-2 during capture A and sample C3-2 during capture B.

The capture of four samples C0-1, C1-1, C2-1, and C3-1 by each Pix1 pixel and of four samples C0-2, C1-2, C2-2, and C3-2 by each Pix2 pixel is implemented in two successive captures A and B.

In the case where k is greater than 1, those skilled in the art are capable of providing pixels Pix1 and Pix2 different from those described as an example in relation with FIGS. 9 to 11, each Pix1 pixel then being, for example, stacked and aligned on a corresponding pixel Pix2 and preferably having the same spatial distribution of samples as the corresponding pixel Pix2. For example, those skilled in the art are capable of providing pixels Pix1 and Pix2 with a single photosite configured to deliver four samples in four successive captures.

FIGS. 12 to 15 illustrate implementation details of the embodiments where number k is equal to 1.

More specifically, FIGS. 12 to 15 each schematically show an embodiment of the spatial distribution of samples C0-1, C1-1, C2-1, C3-1 in pixels Pix1 and of samples C0-2, C1-2, C2-2, and C3-2 in pixels Pix2, for embodiments where number k is equal to 1.

Each of these drawings shows, vertically aligned in the drawing, the spatial distribution of the samples in the pixels Pix1 of level W1 (at the top of the drawing) and the spatial distribution of the samples in the pixels Pix2 of level W2 (at the bottom of the figure). In these drawings, only part of the array of photosites P1 of level W1 and part of the array of photosites P2 of level W2 are shown.

In these drawings, the spatial distribution of samples C0-1, C1-1, C2-1, C3-1 in pixels Pix1 is identical to the spatial distribution of samples C0-2, C1-2, C2-2, C3-2 in pixels Pix2. In other words, in each pixel Pix1, the relative position, with respect to the center O of pixel Pix1, of a photosite P1 which acquires sample C0-1, respectively C1-1, C2-1, and C3-1, is identical to the relative position, with respect to the center O of the corresponding pixel Pix2, of a photosite P2 which acquires sample C0-2, respectively C1-2, C2-2, and C3-2.

In the embodiments illustrated in FIGS. 12 to 15, sensor 12 only comprises photosites P1 and P2 for the determination of a depth image, and preferably the rows of photosites P1, P2 of the sensor are adjacent two by two, columns of photosites P1, P2 of the sensor being adjacent two by two.

In these FIGS. 12 to 15, the rows of photosites P1, P2 are parallel to the y direction and the columns of photosites P1, P2 are parallel to the x direction, levels W1 and W2 being stacked in the z direction.

In FIGS. 12 to 15, pixels Pix1 and Pix2 are delimited by solid lines, and in each pixel Pix1, Pix2, the photosites of the pixel are delimited by dotted lines.

Figure 12:
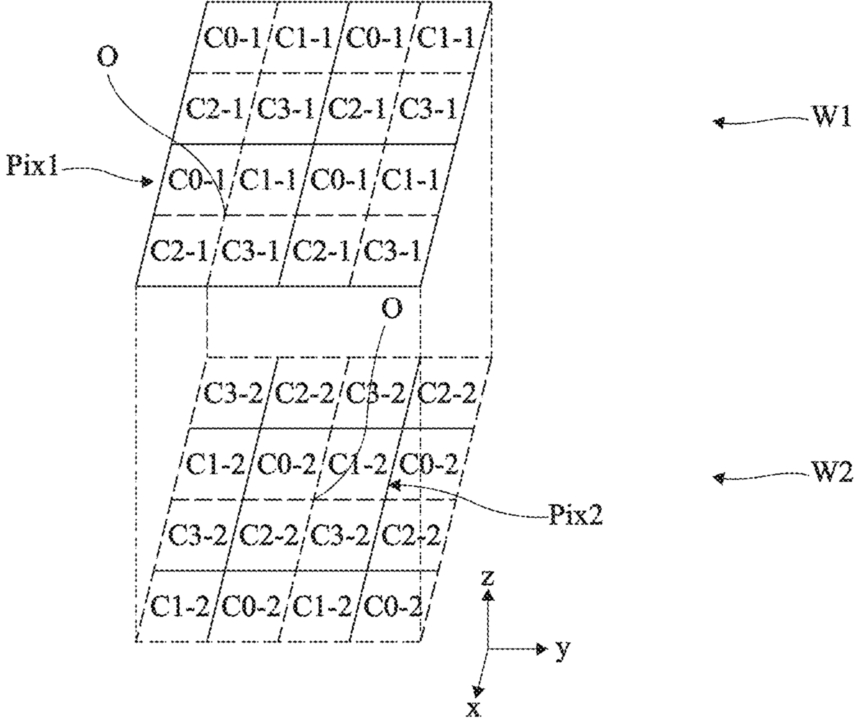
FIG. 12 shows still another embodiment of the spatial distribution of the photodetectors of depth pixels of the sensor of FIG. 3.

In FIG. 12, a single Pix2 pixel is entirely shown, and although four Pix1 pixels are entirely shown, the only referenced pixel Pix1 is that which is associated with the entirely shown pixel Pix2.

In FIG. 12, each pixel Pix1 comprises four photosites P1 configured to acquire respective samples C0-1, C1-1, C2-1, and C3-1. Further, each pixel Pix2 comprises four photosites P2 configured to acquire respective samples C0-2, C1-2, C2-2, and C3-2. The capture of four samples C0-1, C1-1, C2-1, and C3-1 by each pixel Pix1 and of four samples C0-2, C1-2, C2-2, and C3-2 by each pixel Pix2 is then implemented in a single capture.

Further, in FIG. 12, the center O of each pixel Pix2 is offset from the center O of the pixel Pix1 with which it is associated.

More specifically, in this example, the center O of each Pix2 pixel is offset by one row of photosites P1, P2 and one column of photosites P1, P2 from the center O of the pixel Pix1 with which it is associated. In other words, the center O of each pixel Pix2 is offset by one photosite in the x direction and by one photosite in the y direction from the center O of the pixel Pix1 with which it is associated.

As a result, the repetition pitch of the photosites P1, P2 configured to acquire samples C0-1, C0-2, respectively C1-1, C1-2; C2-1, C2-2; and C3-1, C3-2 is equal to 1 in the x direction and in the y direction. This enables the depth map generated by circuit 20 (FIG. 1) to be more spatially accurate in the x direction and in the y direction.

In another example, not illustrated, the center O of each Pix2 pixel is offset by one photosite only in the x direction with respect to the center O of the Pix1 pixel with which it is associated, which enables the depth map generated by circuit 20 to be more spatially accurate in the x direction.

In still another example, not illustrated, the center O of each pixel Pix2 is offset by one photosite only in the y direction with respect to the center O of the pixel Pix1 with which it is associated, enabling the depth map generated by circuit 20 (FIG. 1) to be more spatially accurate in the y direction.

In the example of FIG. 12, the offset of the centers O of pixels Pix2 with respect to the center O of the pixels Pix1 with which they are associated is implemented for each capture, and is the same for each capture.

As an example, the offset of the centers O of pixels Pix2 with respect to the center O of the pixels Pix1 with which they are associated is, for example, implemented by the circuit for controlling pixels Pix1 and Pix2, by means of the control signals that this circuit delivers to photosites P1 and P2.

Figure 13:
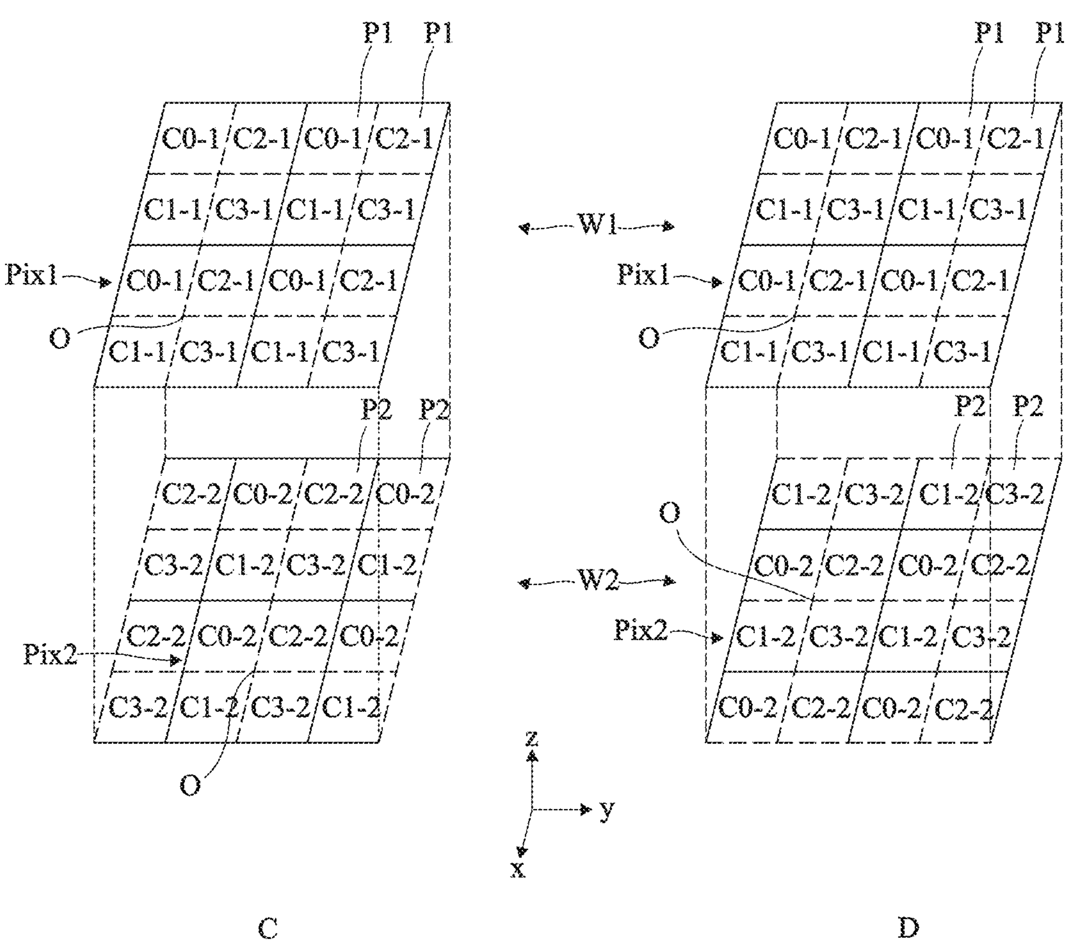
FIG. 13 shows still another embodiment of the spatial distribution of the photodetectors of depth pixels of the sensor of FIG. 3.

In FIG. 13, a single pixel Pix1 and a single pixel Pix2 associated with each other are referenced.

In FIG. 13, each pixel Pix1 comprises four photosites P1 configured to acquire respective samples C0-1, C1-1, C2-1, and C3-1. Further, each pixel Pix2 comprises four photosites P2 configured to acquire respective samples C0-2, C1-2, C2-2, and C3-2. The capture of four samples C0-1, C1-1, C2-1, and C3-1 by each pixel Pix1 and of four samples C0-2, C1-2, C2-2, and C3-2 by each pixel Pix2 is then implemented in a single capture.

In FIG. 13, two successive captures C and D are considered. FIG. 13 illustrates the case where, between the two captures C and D, the center O of each pixel Pix2 is offset with respect to the center O of the pixel Pix1 with which it is associated.

In this example, during capture C (on the left-hand side in FIG. 13), the center O of each pixel Pix2 is offset by one photosite, here in the y direction, with respect to the center O of the pixel Pix1 with which it is associated. During capture C, the repetition pitch of the photosites P1, P2 configured to acquire samples C0-1, C0-2, respectively C1-1, C1-2; C2-1, C2-2; and C3-1, C3-2 is equal to 1 in the y direction and to 2 in the x direction. During capture D (on the right-hand side in FIG. 13), the center O of each pixel Pix2 is offset by one photosite, here in the x direction, with respect to the center O of the pixel Pix1 with which it is associated. During capture C, the repetition pitch of the photosites P1, P2 configured to acquire samples C0-1, C0-2, respectively C1-1, C1-2; C2-1, C2-2; and C3-1, C3-2 is equal to 2 in the y direction and to 1 in the x direction.

As a result, over the two captures C and D, the repetition pitch of the photosites P1, P2 configured to acquire samples C0-1 and C0-2, respectively C1-1 and C1-2, C2-1 and C2-2, and C3-1 and C3-2 is equal to 1 in the x direction and in the y direction.

The example illustrated in FIG. 13 corresponds to the case where, for each two successive captures C and D, the offset of the center O of each pixel Pix2 with respect to the center O of the pixel Pix1 with which it is associated is different for each of the two captures C and D. As an example, this offset is implemented by the circuit for controlling pixels Pix1 and Pix2, by means of the control signals that this circuit delivers to photosites P1 and P2, for example by modifying, between the two captures C and D, the control signals delivered to photosites P2 and/or P1.

In other examples, not illustrated, during capture C, the center O of each pixel Pix2 is aligned with the center O of the pixel Pix1 with which it is associated, and, during capture D, the center O of each pixel Pix2 is offset by one photosite in the x direction and/or by one photosite in the y direction with respect to the center O of the pixel Pix with which it is associated. In other words, this corresponds to the case where, for each two successive captures C and D, the offset of the center O of each pixel Pix2 with respect to the center O of the pixel Pix1 with which it is associated is only implemented for one of the two captures. As an example, this offset is implemented by the circuit for controlling pixels Pix1 and Pix2, by means of the control signals that this circuit delivers to photosites P1 and P2, for example by modifying, between the two captures C and D, the control signals delivered to photosites P2 and/or P1.

Further, although there has been described in relation with FIG. 13 the case where the center O of each pixel Pix2 is offset by one photosite in the x direction and/or by one photosite in the y direction between two successive captures C and D, with no offset of the center O of the pixel Pix1 with which this pixel Pix2 is associated, it is also possible to offset, between these two successive captures C and D, the center O of each pixel Pix1, with or with no offset of the center O of the pixel Pix2 with which this pixel Pix1 is associated. As an example, this offset is implemented by the circuit for controlling pixels Pix1 and Pix2, by means of the control signals that this circuit delivers to photosites P1 and P2, for example by modifying, between the two captures C and D, the control signals delivered to photosites P2 and/or P1.

Figure 14:
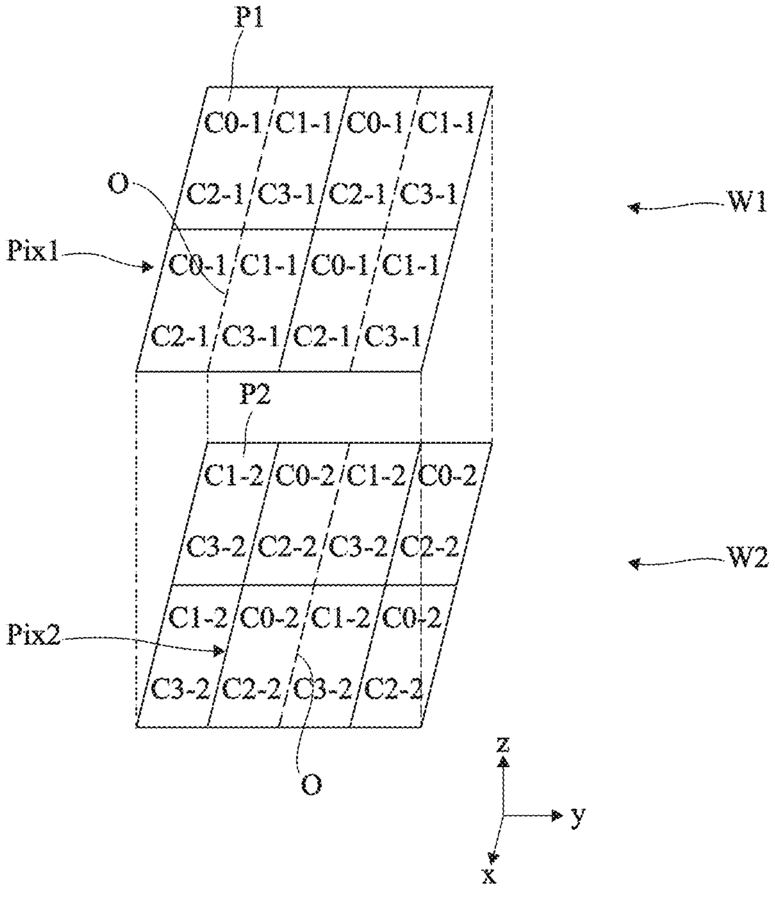
FIG. 14 shows still another embodiment of the spatial distribution of the photodetectors of depth pixels of the sensor of FIG. 3.

In FIG. 14, a single Pix1 pixel and a single Pix2 pixel associated with each other are referenced.

In FIG. 14, each pixel Pix1 comprises two photosites P1, one of the two photosites P1 being configured to acquire two samples, for example C0-1 and C2-1, and the other of the two photosites P1 being configured to acquire two other samples, for example C1-1 and C3-1. Similarly, each pixel Pix2 comprises two photosites P2, one of photosites P2 being configured to acquire two samples, for example C0-2 and C2-2, and the other of the two photosites P2 being configured to acquire two other samples, for example C1-2 and C3-2.

The capture of four samples C0-1, C1-1, C2-1, and C3-1 by each pixel Pix1 and of four samples C0-2, C1-2, C2-2, and C3-2 by each Pix2 pixel is implemented in a single capture.

In the example of FIG. 14, the two photosites P1 of each pixel Pix1 are arranged side by side in the y direction, and, similarly, the two photosites P2 of each pixel Pix2 are arranged side by side in the y direction. As a result, the spatial repetition pitch of photosites P1, P2 configured to acquire samples C0-1, C0-2, respectively C1-1, C1-2; C2-1, C2-2; and C3-1, C3-2 is equal to 1 in the x direction. Further, the center O of each pixel Pix2 is offset by one photosite, in this example in the y direction, with respect to the center O of the pixel Pix1 with which it is associated. As a result, the spatial repetition pitch of the photosites P1, P2 configured to acquire samples C0-1, C0-2, respectively C1-1, C1-2; C2-1, C2-2; and C3-1, C3-2 is also equal to 1 in the y direction.

In another example, not illustrated, the two photosites P1 of each pixel Pix1 are arranged side by side in the x direction, the two photosites P2 of each pixel Pix2 are arranged side by side in the x direction, and the center O of each pixel Pix2 is offset by one photosite in the x direction with respect to the center O of the pixel Pix1 with which it is associated. As a result, the spatial repetition pitch of the photosites P1, P2 configured to acquire samples C0-1, C0-2, respectively C1-1, C1-2; C2-1, C2-2; and C3-1, C3-2 is equal to 1 in the x direction and to 1 in the y direction.

In FIG. 14, the offset of the centers O of pixels Pix2 with respect to the centers O of the pixels Pix1 with which they are associated is implemented for each capture, and is identical for each capture.

As an example, the offset of the centers O of pixels Pix2 with respect to the center O of the pixels Pix1 with which they are associated is, for example, implemented by the circuit for controlling pixels Pix1 and Pix2, by means of the control signals that this circuit delivers to photosites P1 and P2.

Figure 15:
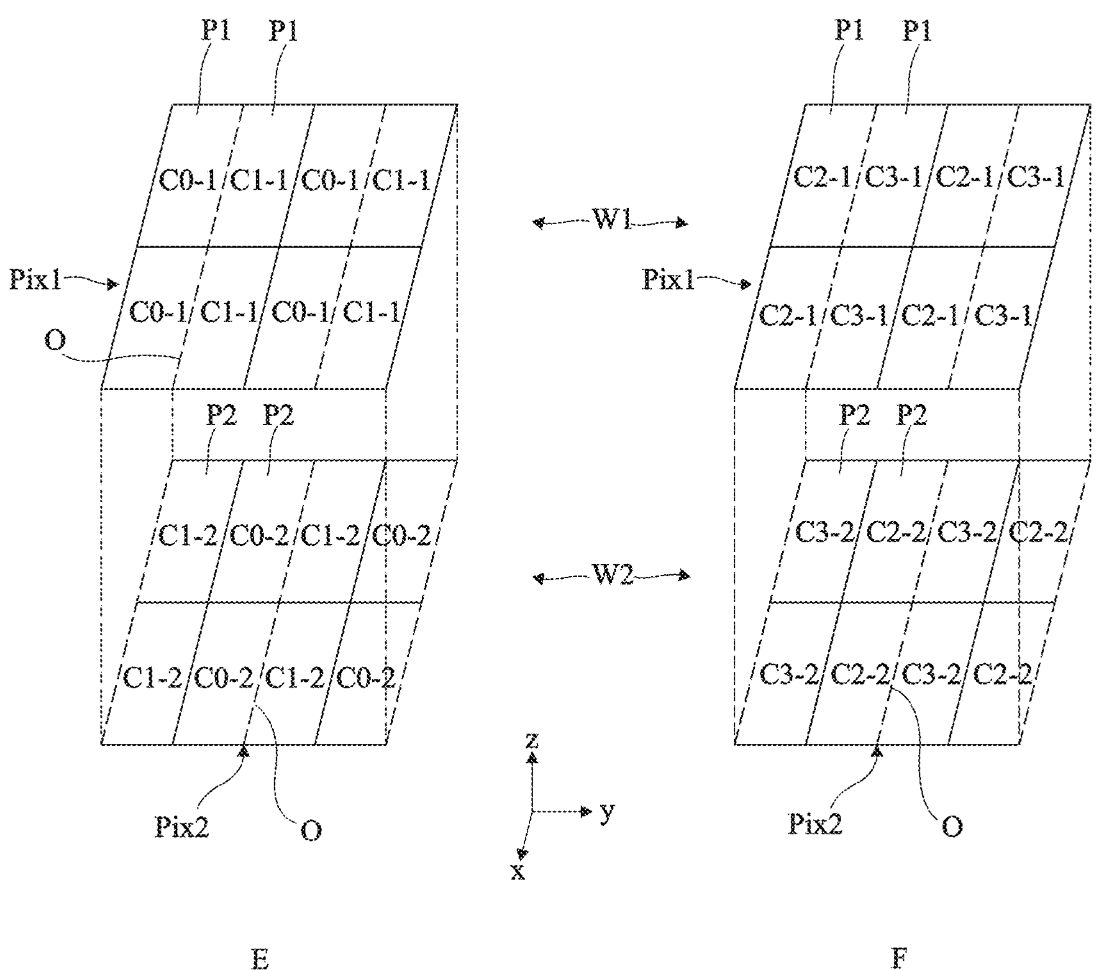
FIG. 15 shows still another embodiment of the spatial distribution of the photodetectors of depth pixels of the sensor of FIG. 3.

In FIG. 15, a single Pix1 pixel and a single Pix2 pixel associated with each other are referenced.

In FIG. 15, each pixel Pix1 comprises two photosites P1, one of the two photosites P1 being configured to acquire two samples during two successive captures E (on the left-hand side in FIG. 15) and F (on the right-hand side in FIG. 15), for example sample C0-1 during the first capture E and sample C2-1 during the second capture F, the other of the two photosites P1 of pixel Pix1 being configured to acquire two other samples during the two successive captures E and F, for example sample C1-1 during the first capture E and sample C3-1 during the second capture F. Similarly, each pixel Pix2 comprises two photosites P2, one of the two photosites P2 of pixel Pix2 being configured to acquire two samples during the two successive captures E and F, for example sample C0-2 during the first capture E and sample C2-2 during the second capture F, the other of the two other photosites P2 of pixel Pix2 being configured to acquire two other samples during the two successive captures E and F, for example sample C1-2 during the first capture E and sample C3-2 during the second capture F. The capture of four samples C0-1, C1-1, C2-1, and C3-1 by each Pix1 pixel and of four samples C0-2, C1-2, C2-2, and C3-2 by each Pix2 pixel is then implemented during the two successive captures E and F.

In the example of FIG. 15, the two photosites P1 of each pixel Pix1 are arranged side by side in the y direction, and, similarly, the two photosites P2 of each pixel Pix2 are arranged side by side in the y direction. As a result, over the two captures E and F, the spatial repetition pitch of the photosites P1, P2 configured to acquire samples C0-1 and C0-2, respectively C1-1 and C1-2, C2-1 and C2-2, and C3-1 and C3-2 is equal to 1 in the x direction. Further, in the example of FIG. 15, the center O of each pixel Pix2 is offset by one photosite, in this example in the y direction, with respect to the center O of the pixel Pix1 with which it is associated. As a result, over the two captures E and F, the spatial repetition pitch of the photosites P1, P2 configured to acquire samples C0-1 and C0-2, respectively C1-1 and C1-2, C2-1 and C2-2, and C3-1 and C3-2 is also equal to 1 in the y direction.

In another example, not illustrated, the two photosites P1 of each pixel Pix1 are arranged side by side in the x direction, the two photosites P2 of each pixel Pix2 are arranged side by side in the x direction, and the center O of each pixel Pix2 is offset by one photosite in the x direction with respect to the center O of the pixel Pix1 with which it is associated. As a result, over the two captures E and F, the spatial repetition pitch of the photosites P1, P2 configured to acquire samples C0-1 and C0-2, respectively C1-1 and C1-2, C2-1 and C2-2, and C3-1 and C3-2 is also equal to 1 in the y direction and in the x direction.

The offset of the centers O of pixels Pix2 with respect to the center O of the pixels Pix1 with which they are associated is implemented for each capture, and is the same for each capture.

As an example, the offset of the centers O of pixels Pix2 with respect to the center O of the pixels Pix1 with which they are associated is, for example, implemented by the circuit for controlling pixels Pix1 and Pix2, by means of the control signals that this circuit delivers to photosites P1 and P2.

In all the above-described embodiments and variants, each row of photosites P1 is stacked on a row of photosites P2, the stack of a row of photosites P1 and of a row of photosites P2 forming a row L of depth photosites of the sensor, and each column of photosites P1 is stacked on a column of photosites P2, the stack of a column of photosites P1 on a column of photosites P2 forming a column R of depth photosites of sensor 12. Further, in these embodiments and variants, sensor 12 is configured to acquire a depth image, but not a 2D image. In this case, preferably, two successive rows L are adjacent, that is, arranged directly next to each other, two successive R columns of depth photosites of sensor 12 being adjacent.

However, in addition to acquiring a depth image, the sensor 12 of the device 10 shown in FIG. 1 may be capable of acquiring a 2D image.

Figure 16:
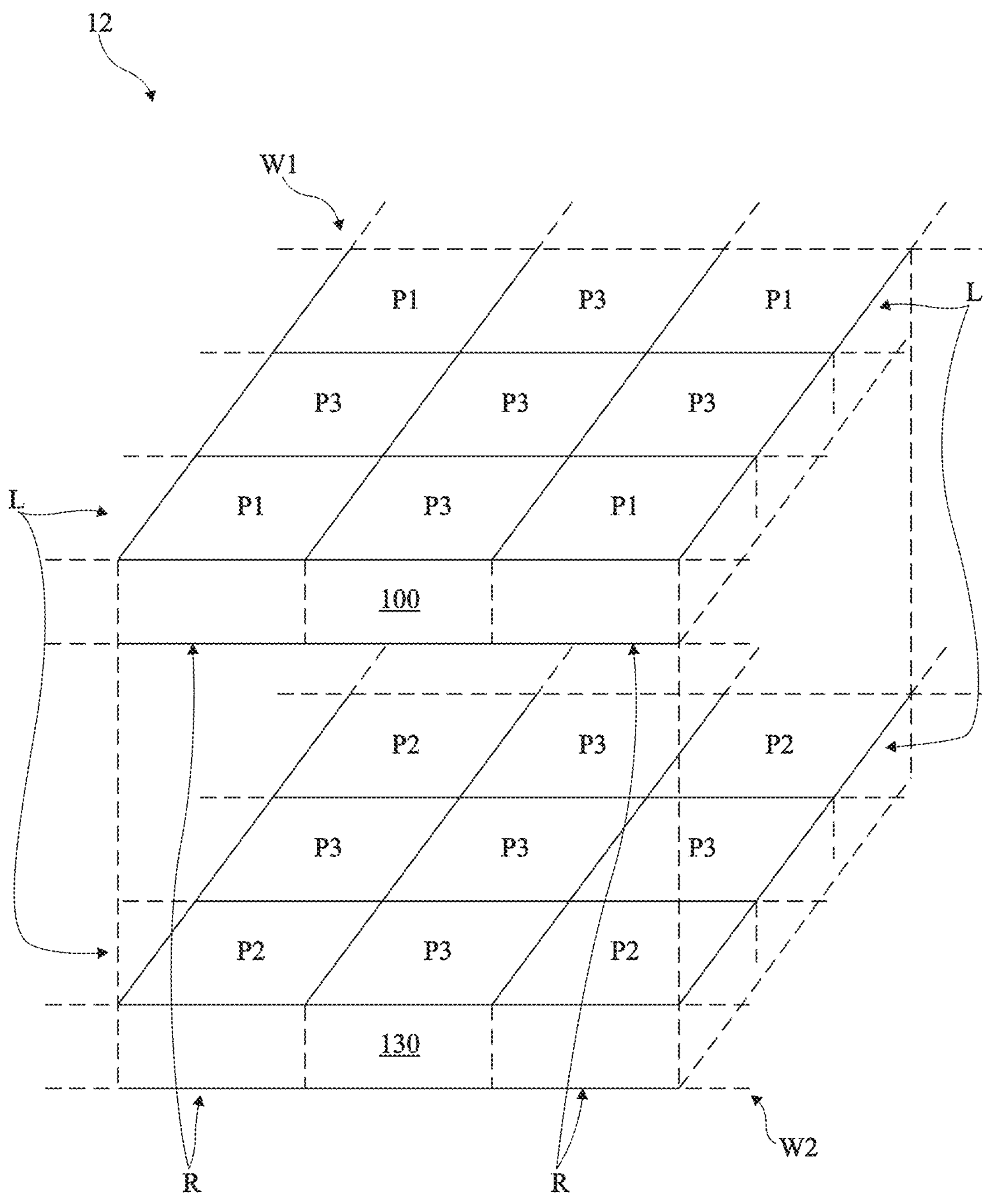
FIG. 16 illustrates an alternative embodiment of the sensor of FIG. 12.

FIG. 16 is a cross-section and perspective view schematically and partially illustrating an embodiment of a sensor 12 of a 2D image and of a depth image of a scene.

In FIG. 16, only the substrate 100 of detection level W1 and the substrate 130 of detection level W2 are shown.

As compared with the previously-described embodiments and variants where sensor 12 only comprises depth photosites P1 and P2, in the embodiment of FIG. 16, sensor 12 additionally comprises 2D image pixels bearing reference P3. In the embodiment of FIG. 12, pixels P3 are arranged inside and on top of substrate 100 and pixels P3 are arranged inside and on top of substrate 130. In variants not shown, pixels P3 are all arranged inside and on top of substrate 100.

Further, as compared with the previously-described embodiments and variants where two successive columns R are adjacent and two successive rows L are adjacent, in the present embodiment, rows of pixels P3 are interposed between each two successive rows L, and columns of pixel P3 are interposed between each two successive columns R.

Each pixel P3 is adapted to measuring a light intensity in a given range of visible wavelengths. For this purpose, and although this is not detailed in FIG. 12, each pixel P3 comprises a photosensitive element, for example a photodiode, formed in the substrate 100 or 130 of the level W1 or W2, respectively, to which this pixel P3 belongs.

Preferably, sensor 12 is configured to acquire a 2D color image. In this case, pixels P3 are of different types, each type of pixel P3 being adapted to measuring a light intensity in a given range of visible wavelengths, distinct from those of the other types of pixels P3. Each pixel P3 then comprises a color filter, for example made of a colored resin, facing the photodiode of pixel P3, the filter being configured to only transmit the wavelengths of light belonging to the wavelength range for which pixel P3 measures the light intensity.

In the case of the embodiment of FIG. 16, where each level W1 and W2 comprises pixels P3, preferably two pixels P3 stacked one on top of the other share the same color filter, and the color filter rests on substrate 100 which receives the incident light before substrate 130, and, more particularly, on the side of substrate 100 which receives the incident light. As a variant, each pixel P3 may have its own color filter, the latter resting on the substrate 100 or 130 inside and on top of which pixel P3 is formed, on the side of this substrate 100 or 130 which receives the incident light.

In another embodiment, not illustrated, only level W1 comprises pixels P3. In this case, the color filter of each P3 pixel rests on substrate 100, on the side of substrate 100 which receives the incident light.

As an example, sensor 12 comprises three types of pixels P3, first pixels P3 called blue pixels, comprising a color filter preferentially transmitting blue light, second pixels P3 called red pixels, comprising a color filter preferentially transmitting red light, and third pixels P3 called green pixels, comprising a color filter preferentially transmitting green light. In FIG. 16, the different types of pixels P3 are not differentiated.

As a variant, sensor 12 is configured to capture a monochromatic 2D image, in which case the color filters of pixels P3 can be omitted.

Those skilled in the art are capable of adapting the description made in relation with FIGS. 3 and 9 to 15 in the case where rows L are adjacent two by two and columns R are adjacent two by two to the case of FIG. 16 where each two successive rows L are separated from each other by one or a plurality of rows of pixels P3, and each two successive columns R are separated from each other by one or a plurality of columns of pixels P3. In other words, those skilled in the art will be capable of adapting this description to the case where each row L is separated from a next row L by one or a plurality of rows of pixels P3, and each column R is separated from a next column R by one or a plurality of columns of pixels P3.

Various embodiments and variants have been described. Those skilled in the art will understand that certain features of these various embodiments and variants may be combined, and other variants will occur to those skilled in the art.

In particular, the pixels and photosites have been shown in the various drawings with square or rectangular shapes in top view. However, those skilled in the art may provide other shapes of pixels and/or of photosites, for example photosites having, in top view, triangular shapes.

Further, those skilled in the art are capable of adapting the description made hereabove of the case of a sensor based on the acquisition of four samples per depth pixel to calculate a distance d for this pixel to the case of a sensor based on the acquisition of only three samples per pixel to calculate a distance d for this pixel.

Finally, the practical implementation of the described embodiments and variants is within the abilities of those skilled in the art based on the functional indications given hereabove. In particular, those skilled in the art are capable of designing the circuit for controlling pixels Pix1, Pix2 enabling to implement the various described examples of embodiments and variants.

The invention claimed is:

1. Device for acquiring a depth image of a scene, comprising a sensor of a reflected light signal corresponding to the reflection on the scene of an incident light signal, wherein:

the sensor comprises a first detection level stacked on a second detection level;

each detection level comprises an array of depth pixels, each depth pixel of said level comprising at least one photodetector and being configured to acquire at least first, second, and third samples of charges photogenerated in said pixel during respective first, second, and third durations, the first, second, and third durations of said level being periodic according to a first frequency of said level, each photodetector of the first level is stacked on a photodetector of the second level, and the first frequency of the second level is equal to k times the first frequency of the first level, with k a number greater than or equal to 1, the device further comprising a calculation circuit configured to calculate, for each depth pixel of each of the first and second levels, a distance based on the first, second, and third samples of said depth pixel, and, based on said calculated distances, a depth map of the scene.

2. Device according to claim 1, further comprising a circuit for controlling the depth pixels.

3. Device according to claim 1, wherein number k is greater than 1.

4. Device according to claim 3, wherein number k is an integer.

5. Device according to claim 3, wherein number k is greater than 7.

6. Device according to claim 3, comprising a light source configured to deliver the incident light signal so that:

the incident light signal comprises a first light signal at a first wavelength and a second light signal at a second wavelength different from the first wavelength, the first light signal is amplitude-modulated at the first frequency of the first level, and the second light signal is amplitude-modulated at the first frequency of the second level.

7. Device according to claim 6, comprising a filter arranged between the first and second levels of the sensor, configured to block the first light signal and to let through the second light signal.

8. Device according to claim 3, further comprising a light source configured to deliver the incident light signal amplitude-modulated simultaneously at the first frequency of the first level and at the first frequency of the second level.

9. Device according to claim 8, wherein number k is determined so that the contribution of the first frequency of the first level to a measurement, by the second level, of the first frequency of the second level in the reflected signal is lower than a target value.

10. Device according to claim 8, wherein number k is greater than or equal to 20.

11. Device according to claim 3, wherein each depth pixel of the first level is associated with a corresponding depth pixel of the second level.

12. Device according to claim 11, wherein each depth pixel of the first level is stacked on the depth pixel of the second level with which it is associated.

13. Device according to claim 12, wherein, for each stack of a depth pixel of the first level on a depth pixel of the second level, the calculation circuit is configured to remove an uncertainty regarding the distance calculated for the depth pixel of the second level based on the distance calculated for the depth pixel of the first level.

14. Device according to claim 1, wherein:

k is equal to 1, each depth pixel comprises at least two photodetectors, each depth pixel of the first level is associated with a corresponding depth pixel of the second level, and the centers of the depth pixels of the first level are offset with respect to the centers of the corresponding depth pixels of the second level.

15. Device according to claim 14, wherein:

the offset is constant for each capture; or for each two successive captures, the offset is implemented for only one of the two captures; or for each two successive captures, the offset is different between the two captures.

16. Device according to claim 14, further comprising a circuit for controlling the depth pixels, wherein the circuit for controlling the depth pixels is configured to implement said offset.

17. Device according to claim 14, wherein the calculation circuit is configured to improve the accuracy of the depth map in a direction of the offset of the centers of the depth pixels of the first level with respect to the centers of the corresponding depth pixels of the second level.

18. Device according to claim 14, wherein:

the photodetectors of the depth pixels are organized in rows and in columns, the rows are orthogonal to the columns, the rows and the columns are orthogonal to a direction of stacking of the first level on the second level, and said offset corresponds to an offset by one row and/or by one column.

19. Device according to claim 14, further comprising a circuit configured to synchronize the first, second, and third durations of the first level with, respectively, the first, second, and third durations of the second level.

20. Device according to claim 14, further comprising a light source configured to deliver the incident light signal amplitude-modulated at the first frequency only.

21. Device according to claim 1, wherein the sensor is configured to receive the reflected light signal on the side of the first level.

22. Device according to claim 1, wherein at least the first level further comprises 2D image pixels.

23. Device according to claim 22, wherein the photodetectors of the depth pixels are organized in rows and in columns, the rows being orthogonal to the columns, the rows and the columns further being orthogonal to a stacking direction of the first level on the second level, and wherein the 2D image pixels are arranged between two successive rows and/or between two successive columns.

* * * * *